United States Patent
Seo et al.

(10) Patent No.: US 11,582,740 B2
(45) Date of Patent: Feb. 14, 2023

(54) METHOD FOR REDUCING COMPLEXITY IN DOWNLINK CONTROL CHANNEL FOR SAVING POWER IN WIRELESS COMMUNICATION SYSTEM, AND TERMINAL USING SAME METHOD

(71) Applicant: LG Electronics Inc., Seoul (KR)

(72) Inventors: Inkwon Seo, Seoul (KR); Daesung Hwang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 17/263,773

(22) PCT Filed: Jul. 29, 2019

(86) PCT No.: PCT/KR2019/009410
§ 371 (c)(1),
(2) Date: Jan. 27, 2021

(87) PCT Pub. No.: WO2020/022857
PCT Pub. Date: Jan. 30, 2020

(65) Prior Publication Data
US 2021/0185651 A1    Jun. 17, 2021

(30) Foreign Application Priority Data

Jul. 27, 2018 (KR) .................. 10-2018-0087858
Sep. 21, 2018 (KR) .................. 10-2018-0114353
Sep. 28, 2018 (KR) .................. 10-2018-0116381

(51) Int. Cl.
*H04W 72/04* (2009.01)
*H04W 24/08* (2009.01)
*H04W 52/02* (2009.01)

(52) U.S. Cl.
CPC ......... *H04W 72/042* (2013.01); *H04W 24/08* (2013.01); *H04W 52/0209* (2013.01)

(58) Field of Classification Search
CPC ......... H04W 72/1268; H04W 72/0446; H04W 72/0493; H04W 72/042; H04W 72/0453;
(Continued)

(56) References Cited

U.S. PATENT DOCUMENTS 9,572,063 B2 * 2/2017 Etemad ............... H04L 41/0823
2014/0185508 A1 * 7/2014 Suda .................... H04W 72/14
370/311
(Continued)

FOREIGN PATENT DOCUMENTS

KR     20110134305     12/2011
WO     WO2016208997   12/2016

OTHER PUBLICATIONS

3rd Generation Partnership Project; Technical Specification Group Radio Access Network, "NR; Physical layer procedures for control (Release 15)," 3GPP TS 38.213, V15.2.0, dated Jun. 2018, 98 pages.
(Continued)

*Primary Examiner* — Wei Zhao
(74) *Attorney, Agent, or Firm* — Fish & Richardson P.C.

(57) ABSTRACT

The present disclosure relates to a method for performing monitoring, performed by user equipment (UE), in a wireless communication system, the method comprising: receiving information related to monitoring from a network; and performing monitoring on the basis of the information related to monitoring, wherein the information related to monitoring is information related to reduction of a range of a target which the UE will monitor.

12 Claims, 24 Drawing Sheets

(58) Field of Classification Search
CPC ......... H04W 52/0209; H04W 52/0225; H04W 24/08; H04W 4/80; H04L 5/0092
See application file for complete search history.

(56) References Cited

U.S. PATENT DOCUMENTS

2017/0303158 A1    10/2017  Yang et al.
2020/0214015 A1*   7/2020   Zhou ................ H04W 72/1268

OTHER PUBLICATIONS

NTT DOCOMO, Inc., "Offline summary for AI 7.1.3.1.2 Search space," R1-1805538, 3GPP TSG RAN WG1 Meeting #92bis, Sanya, China, dated Apr. 16-20, 2018, 39 pages.

* cited by examiner

METHOD FOR REDUCING COMPLEXITY IN DOWNLINK CONTROL CHANNEL FOR SAVING POWER IN WIRELESS COMMUNICATION SYSTEM, AND TERMINAL USING SAME METHOD

CROSS-REFERENCE TO RELATED APPLICATIONS

This application is a National Stage application under 35 U.S.C. § 371 of International Application No. PCT/KR2019/009410, filed on Jul. 29, 2019, which claims the benefit of Korean Patent Application No. 10-2018-0087858 filed on Jul. 27, 2018, Korean Patent Application No. 10-2018-0114353 filed on Sep. 21, 2018 and Korean Patent Application No. 10-2018-0116381 filed on Sep. 28, 2018. The disclosures of the prior applications are incorporated by reference in their entirety.

BACKGROUND OF THE DISCLOSURE

Field of the Disclosure

The present disclosure relates to wireless communication, and more particularly, to a method for reducing downlink control channel complexity for power saving in a wireless communication system and a terminal (or a user equipment (UE)) using the method.

Related Art

Recently, the 3GPP standardization organization is considering a network slicing scheme that implements a plurality of logical networks on a single physical network in a new RAT (NR) system, a 5G wireless communication system. The logical networks should be able to support services having various requirements (e.g., eMBB, mMTC, URLLC, etc.), and a physical layer system of the NR system considers a scheme of supporting orthogonal frequency division multiplexing (OFDM) that may have a variable numerology according to the various services. In other words, in the NR system, an OFDM scheme (or multi-access scheme) having an independent numerology for each time and frequency resource domain may be considered.

Meanwhile, an NR physical downlink control channel (PDCCH) has complexity higher than an LTE PDCCH due to the use of a demodulation reference signal (DMRS) and configuration of a number of control resource sets (CORESETs) and search space sets, and performing wireless communication based on higher complexity may increase power consumption to cause a reduction in operating time of a user equipment (UE).

Therefore, the present disclosure provides a method and device for reducing downlink control channel complexity for power saving.

SUMMARY OF THE DISCLOSURE

The present disclosure provides a method for reducing downlink control channel complexity for power saving in a wireless communication system and a terminal using the method.

In an aspect, a method for performing monitoring by a user equipment (UE) in a wireless communication system is provided. The method may comprise receiving information related to monitoring from a network and performing monitoring based on the information related to monitoring, wherein the information related to monitoring is information related to reducing a range of a target to be monitored by the UE.

The UE may receive information on monitoring candidates from the network and performs monitoring on some of the monitoring candidates based on the information related to monitoring.

The information related to monitoring may be transmitted based on downlink control information (DCI) or a physical downlink shared channel (PDSCH).

A control resource set (CORESET), a search space (SS) set, an aggregation level (AL), or all or some of the candidates to be monitored by the UE may be indicated by the network after the UE receives the DCI.

At least one CORESET may be configured in the UE by explicit signaling of the network or implicit decision of the UE, and the UE turns on or off monitoring on the at least one CORESET based on the information related to monitoring.

The UE may perform monitoring on the at least one CORESET if the information related to monitoring indicates ON of the at least one CORESET, and the UE skips monitoring on the at least one CORESET if the information related to monitoring indicates OFF of the at least one CORESET.

At least one SS set may be configured in the UE by the explicit signaling of the network or the implicit decision of the UE, and the UE turns on or off monitoring on the at least one SS set based on the information related to monitoring.

The information related to monitoring may transmitted based on a CORESET configuration.

The CORESET configuration may include a transmission configuration indicator (TCI) state linked to each CORESET, and the UE does not perform monitoring on the CORESET linked to the TCI state if the TCI state is an unavailable value.

The UE may report a capability for operating in a power saving mode to the network.

An application time point of the power saving mode or a configuration for the power saving for the UE may be indicated by the network through higher layer signaling.

The UE may communicate with at least one of a mobile terminal, a network, and an autonomous vehicle other than the device.

The UE may implement an advanced driver assistance system (ADAS) function based on a signal for controlling movement of a device.

The UE may switch a driving mode of the device from an autonomous driving mode to a manual driving mode or from the manual driving mode to the autonomous driving mode upon receiving a user input, and/or the UE performs autonomous driving based on external object information, wherein the external object information includes at least one of information on the presence or absence of an object; location information of the object, distance information between the device and the object, and relative speed information between the device and the object.

In another aspect, a user equipment may be provided. The user equipment may comprise a memory, a transceiver and a processor operably coupled to the memory and the transceiver, wherein the processor is configured to receive information related to monitoring from a network and to perform monitoring based on the information related to monitoring, and the information related to monitoring is information related to reducing a range of a target to be monitored by the UE.

In other aspects, a processor for a wireless communication device in a wireless communication system may be provided.

The processor may be configured to receive information related to monitoring from a network and to perform monitoring based on the information related to monitoring, and the information related to monitoring is information related to reducing a range of a target to be monitored by the UE.

According to the present disclosure, performing of blind decoding and channel estimation on information that does not need to be received may be prevented, thus preventing unnecessary power consumption and obtaining a power saving effect.

DESCRIPTION OF EXEMPLARY EMBODIMENTS

In what follows, for those terms or acronyms not defined separately, the 3GPP TS 36 series or TS 38 series may be referred to.

Figure 1:
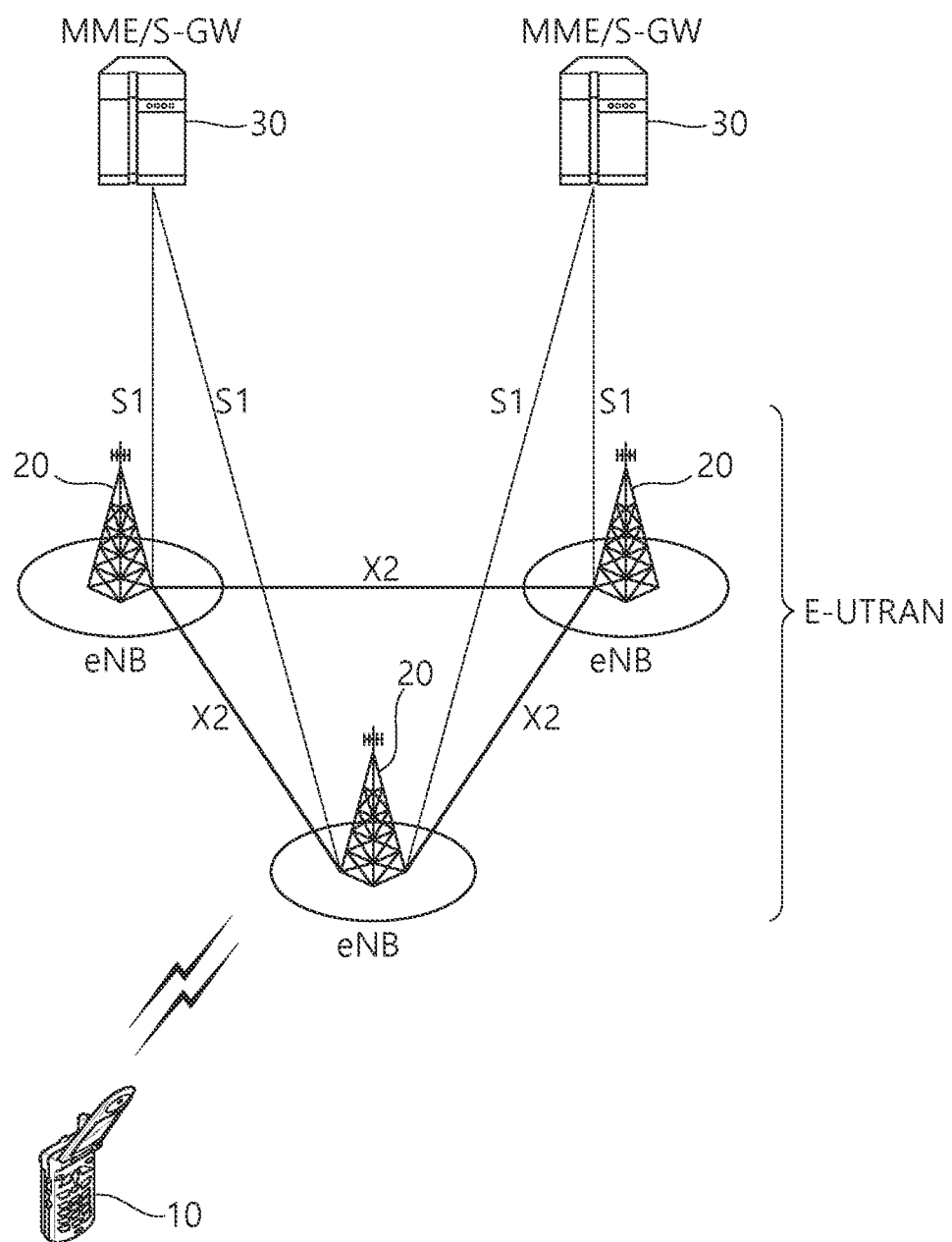
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
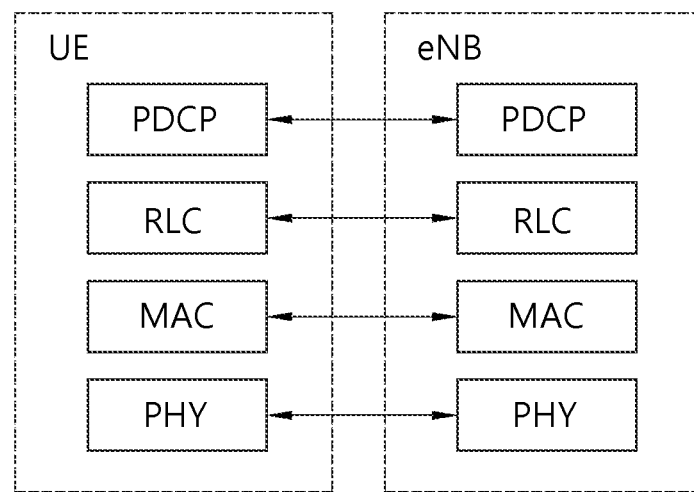
FIG. 2 is a diagram showing a wireless protocol architecture for a user plane.
Figure 3:
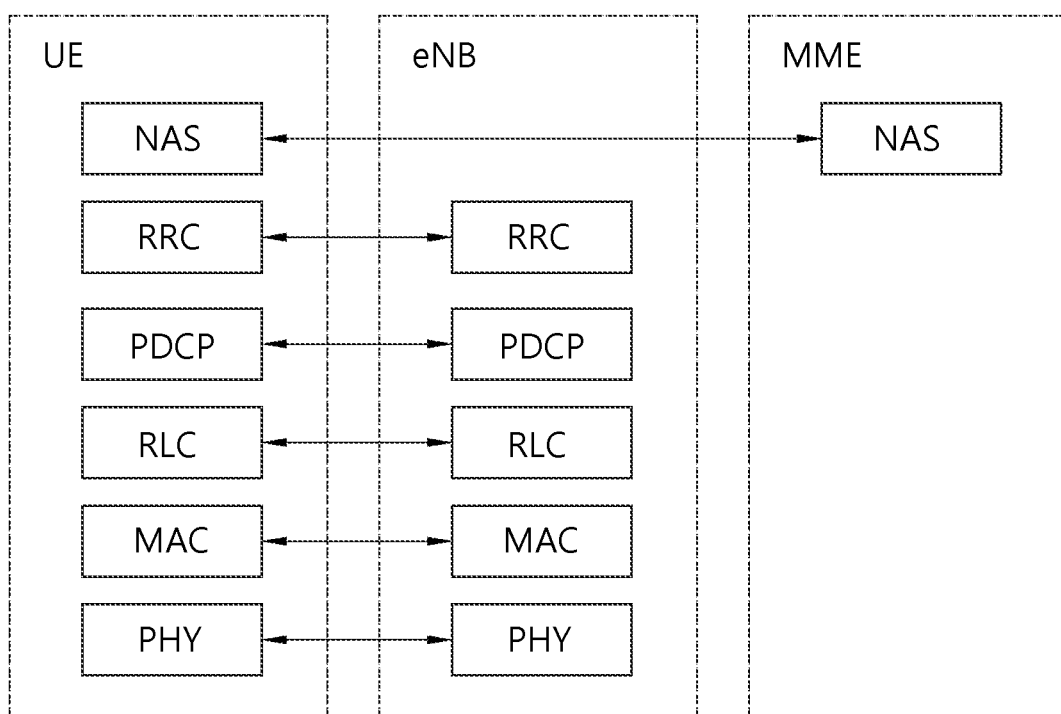
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) will be described. The new RAT may be abbreviated as new radio (NR).

As more communication devices demand larger communication capacities, there is a need for improved mobile broadband communication as compared to the existing radio access technologies (RAT). Massive machine type Communications (MTC), which connects multiple devices and objects to provide various services anytime and anywhere, is also one of the major issues to consider in next-generation communication. In addition, communication system design considering services/terminals that are sensitive to reliability and latency has been discussed. The introduction of next-generation wireless access technologies considering such enhanced mobile broadband communication, massive MTC, ultra-reliable and low latency communication (URLLC), and the like, has been discussed, and the corresponding technology is referred to as new RAT or NR for the convenience sake in the present disclosure.

Figure 4:
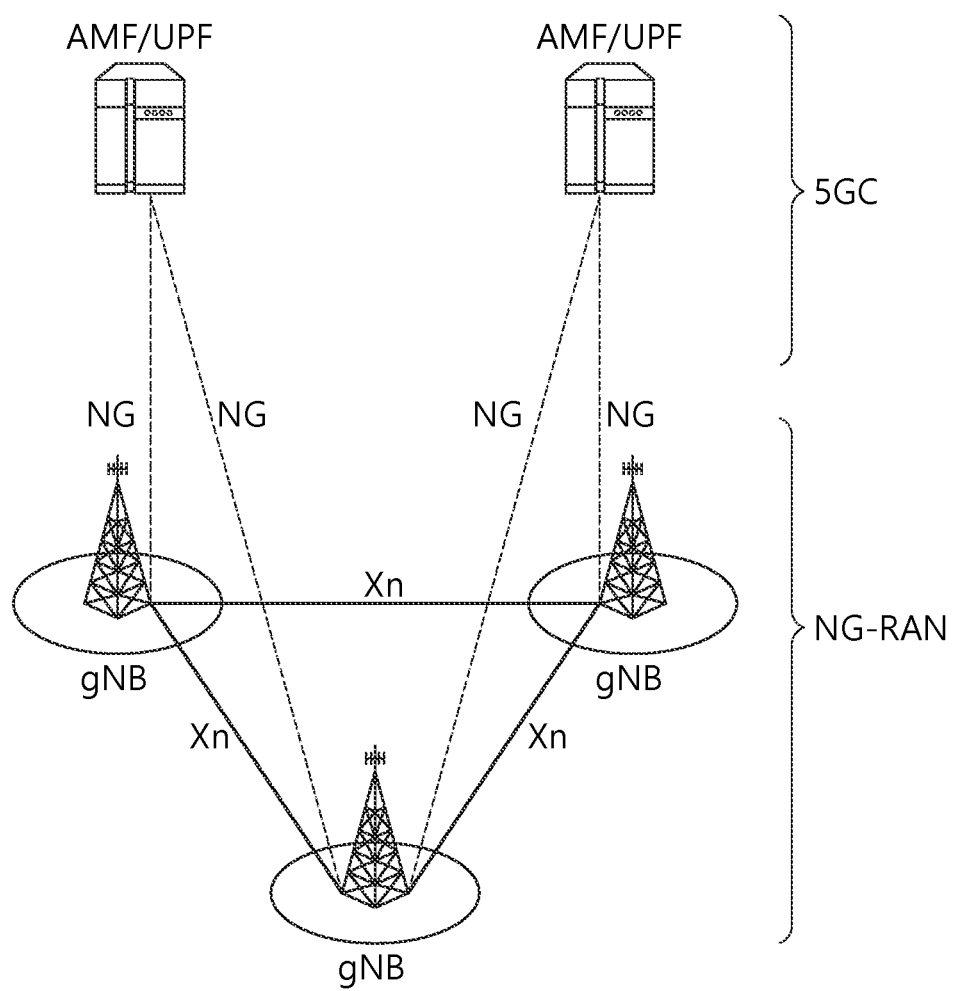
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
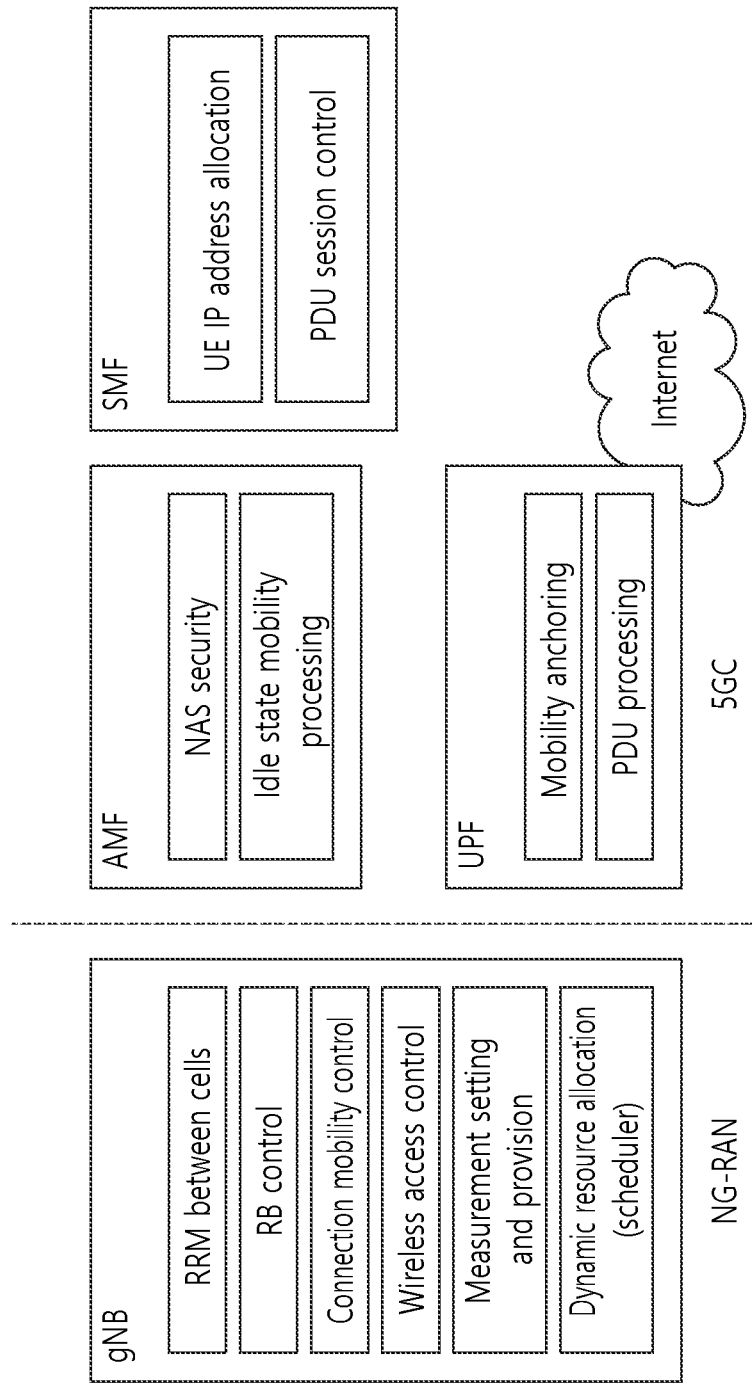
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

<3GPP LTE and New RAT (NR)>

In what follows, descriptions about the LTE and the NR will be given. Regarding the TS 36 series of the 3GPP specification, as a larger number of communication devices require greater communication capacity, a need for mobile broadband communication more enhanced than the legacy radio access technology is emerging. Also, massive Machine Type Communication (MTC) that connects a plurality of devices and objects to each other and provides various services anytime and anywhere is one of primary issues to be considered in the next-generation communication. More-over, a communication system design that considers a service/UE sensitive to reliability and latency is under discussion.

As described above, adoption of the next-generation radio access technology (RAT) that takes account of enhanced mobile broadband communication (eMBB), massive MTC (mMTC), and Ultra Reliable and Low Latency Communication (URLLC) is being discussed, and in the present disclosure, for the purpose of convenience, the corresponding technology is called New RAT (NR).

Figure 6:
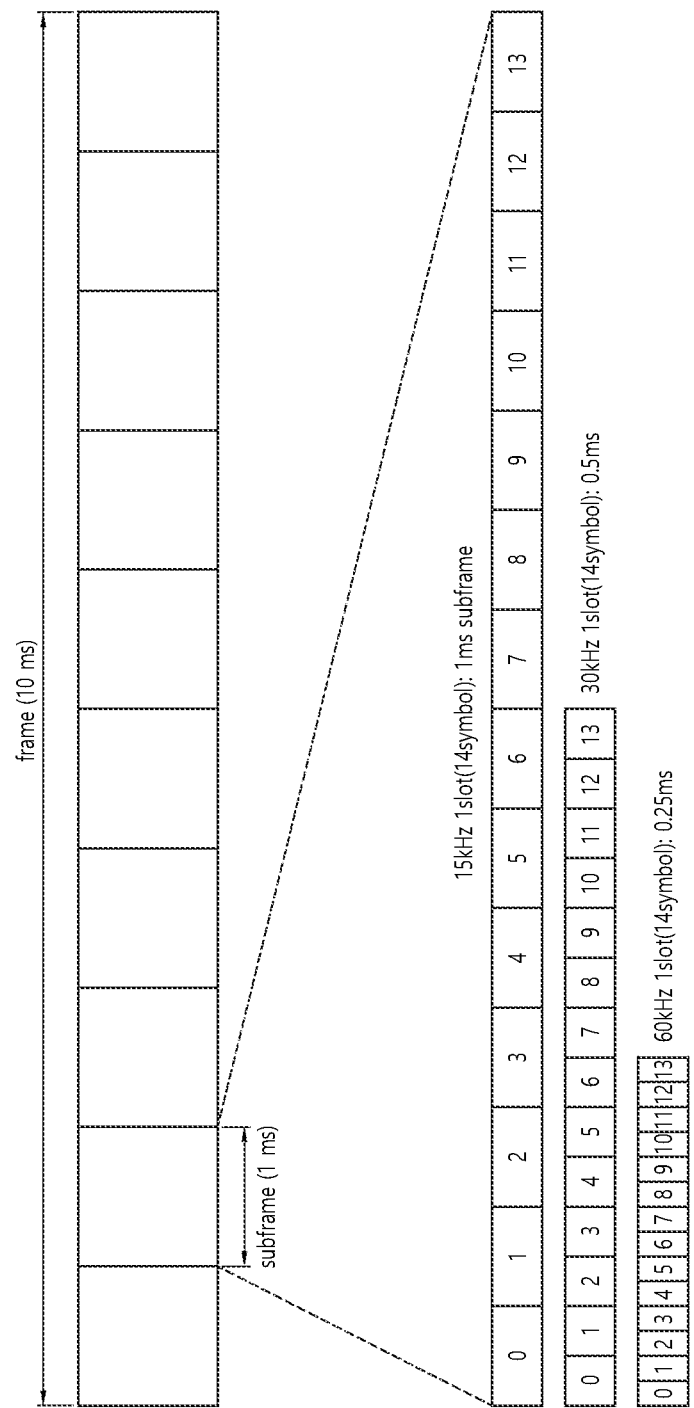
FIG. 6 illustrates a frame structure applicable in NR.

FIG. 6 illustrates a frame structure applicable in NR.

Referring to FIG. 6, a frame may consist of 10 milliseconds (ms) and may include 10 subframes of 1 ms.

A subframe may include one or a plurality of slots according to subcarrier spacing.

Table 1 below shows subcarrier spacing configuration μ.

TABLE 1

| μ | $\Delta f = 2^\mu \cdot 15$ [kHz] | CP(Cyclic Prefix) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number of slots in a frame ($N^{frame,\mu}_{slot}$), the number of slots in a subframe ($N^{subframe,\mu}_{slot}$), ($N^{slot}_{symb}$) and the number of symbols in a slot according to the subcarrier spacing configuration μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 shows μ=0, 1, and 2.

A physical downlink control channel (PDCCH) may include one or more control channel elements (CCEs) as shown in Table 3 below.

TABLE 3

| Aggregation level | Number of CCEs |
|---|---|
| 1 | 1 |
| 2 | 2 |
| 4 | 4 |
| 8 | 8 |
| 16 | 16 |

In other words, the PDCCH may be transmitted through a resource including 1, 2, 4, 8 or 16 CCEs. Here, the CCE includes six resource element groups (REGs), and one REG includes one resource block in the frequency domain and one orthogonal frequency division multiplexing (OFDM) symbol in the time domain.

Meanwhile, in the NR, a new unit called a control resource set (CORESET) may be introduced. A UE may receive the PDCCH in the CORESET.

Figure 7:
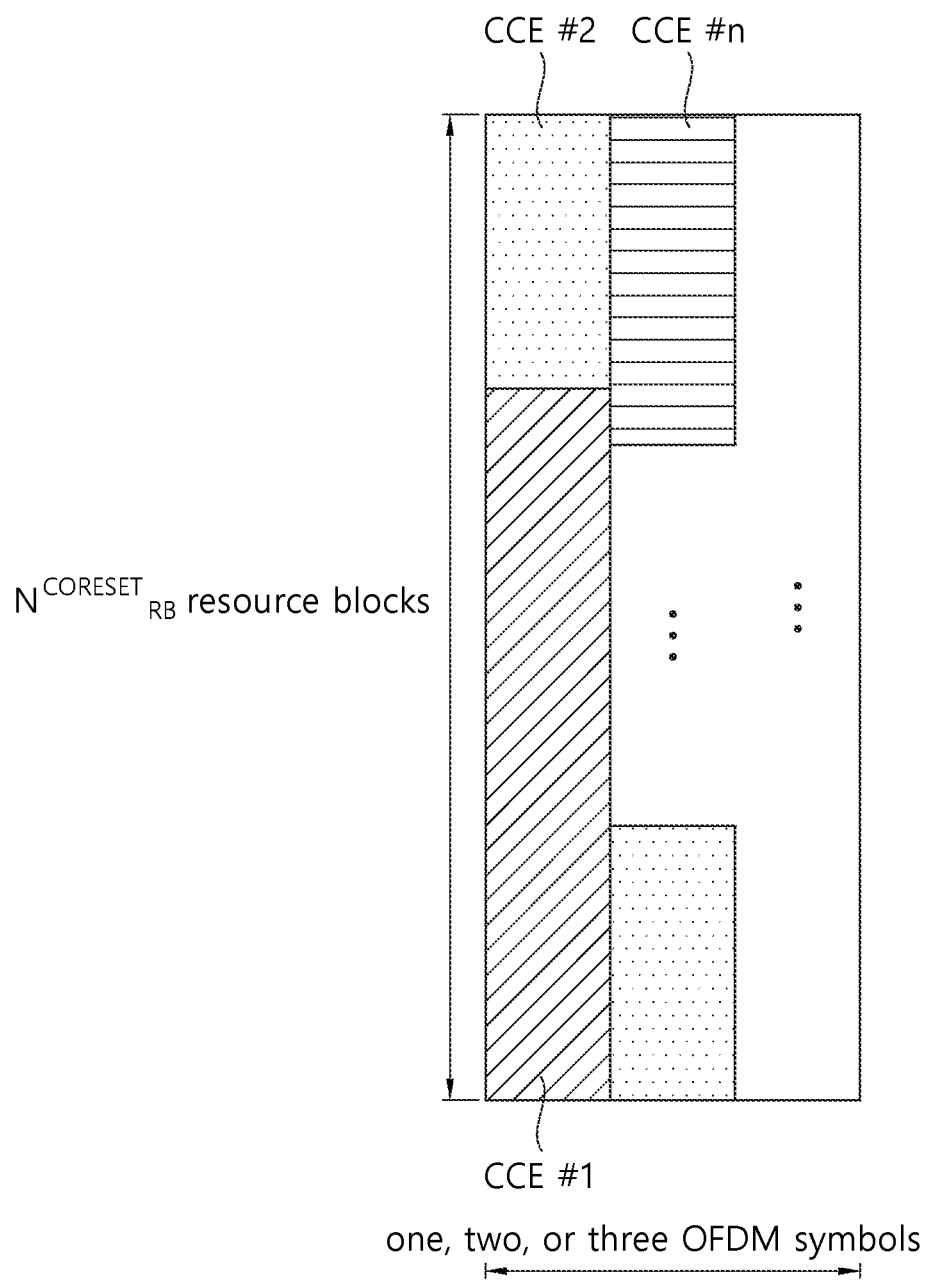
FIG. 7 illustrates a CORESET.

FIG. 7 illustrates a CORESET.

Referring to FIG. 7, the CORESET may include $N^{CORESET}_{RB}$ resource blocks in the frequency domain and $N^{CORESET}_{symb} \in \{1, 2, 3\}$ symbols in the time domain. $N^{CORESET}_{RB}$ and $N^{CORESET}_{symb}$ may be provided by a base station (BS) through higher layer signaling. As shown in FIG. 7, a plurality of CCEs (or REGs) may be included in the CORESET.

The UE may attempt to detect a PDCCH in units of 1, 2, 4, 8 or 16 CCEs in the CORESET. One or a plurality of CCEs for attempting PDCCH detection may be referred to as PDCCH candidates.

A plurality of CORESETs may be configured for the UE.

Figure 8:
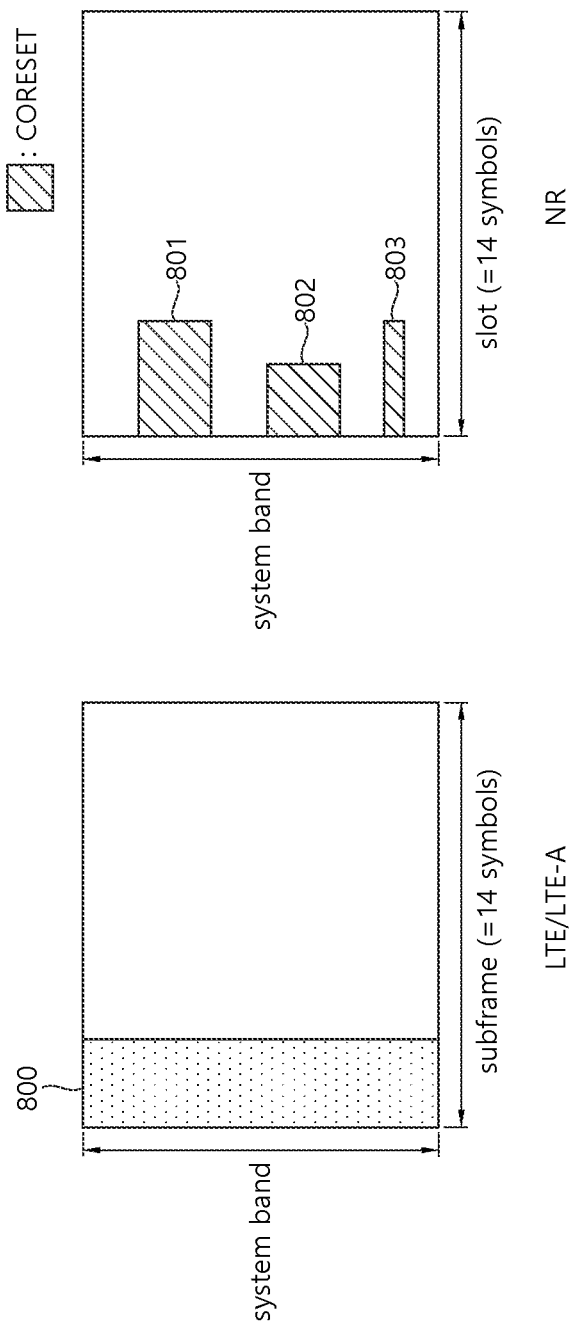
FIG. 8 is a view illustrating a difference between a legacy control region and a CORESET in the NR.

FIG. 8 is a view illustrating a difference between a legacy control region and a CORESET in the NR.

Referring to FIG. 8, a control region 800 in the legacy wireless communication system (e.g., LTE/LTE-A) is configured in the entire system band used by a BS. All terminals, excluding some UEs that support only a narrow band (e.g., eMTC/NB-IoT terminals), were supposed to be able to receive wireless signals of the entire system band of the BS in order to properly receive/decode control information transmitted from the BS.

Meanwhile, in the NR, the aforementioned CORESET was introduced. CORESETs 801, 802, and 803 may be radio resources for control information that the UE should receive and may use only a part of the system band, not the entire system band. The BS may allocate the CORESET to each terminal, and may transmit control information through the allocated CORESET. For example, in FIG. 8, a first CORESET 801 may be allocated to UE 1, a second CORESET 802 may be allocated to UE 2, and a third CORESET 803 may be allocated to UE 3. The UE in the NR may receive the control information from the BS even if the UE does not necessarily receive the entire system band.

The CORESET may include a UE-specific CORESET for transmitting UE-specific control information and a common CORESET for transmitting control information common to all UEs.

Meanwhile, in the NR, high reliability may be required depending on an application field, and in this context, a target block error rate (BLER) for a downlink control information (DCI) transmitted through a downlink control channel (e.g., physical downlink control channel (PDCCH)) may be significantly lower than that of the related art. As an example of a method for satisfying the requirement for such high reliability, the amount of contents included in the DCI may be reduced and/or the amount of resources used in DCI transmission may be increased. Here, the resource may include at least one of a resource in the time domain, a resource in the frequency domain, a resource in a code domain, and a resource in a spatial domain.

In the NR, the following techniques/features may be applied.

<Self-Contained Subframe Structure>

To minimize latency in the fifth generation NR, a structure in which a control channel and a data channel are TDMed as shown in the figure below may be considered as one of frame structures.

Figure 9:
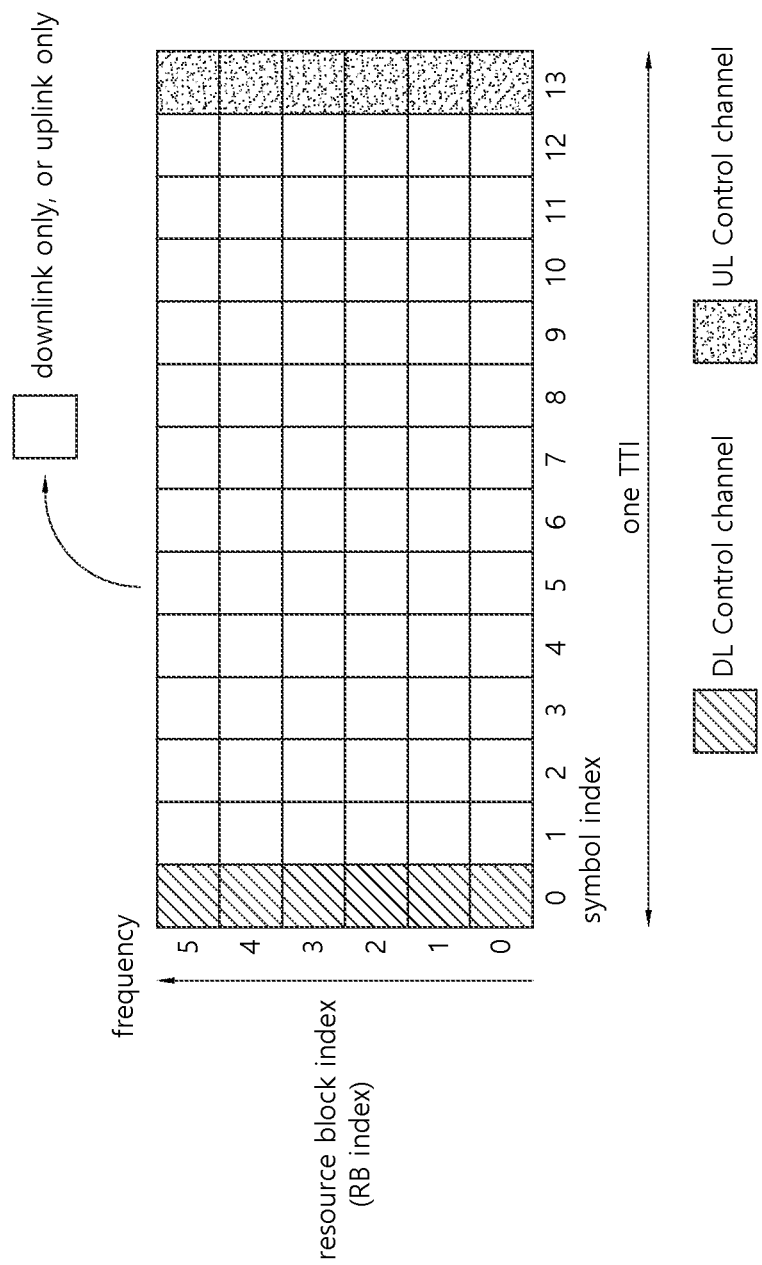
FIG. 9 illustrates one example of a frame structure based on the Time Division Multiplexing (TDM) of a data channel and a control channel.

FIG. 9 illustrates one example of a frame structure based on the Time Division Multiplexing (TDM) of a data channel and a control channel.

According to FIG. 9, as one example of frame structures, one subframe (here, a subframe may be called interchangeably a transmission time interval (TTI)) may be expressed based on an index of a resource block (RB) and an index of a symbol. At this time, one TTI may include a region related to a downlink control channel, a region related to an uplink control channel, and a downlink or uplink region.

For example, to describe the TTI structure with reference to FIG. 9, the hatched region represents a downlink control region, and the region in black color represents an uplink control region. The region without any mark may be used for transmission of downlink data or transmission of uplink data. A characteristic feature of this structure is that downlink (DL) transmission and uplink (UL) transmission are performed sequentially within one subframe, and DL data may be transmitted and UL Acknowledged/Not-Acknowledged (ack/nack) may be received within one subframe. Consequently, when an error occurs during data transmission, a time required for retransmitting data may be reduced, and thus, latency to finally transmit data may be minimized.

A time gap for a process of switching from a transmission mode to a reception mode or from the reception mode to the transmission mode by a base station and a UE in the data and control TDMed subframe structure is required. To this purpose, in the subframe structure, some of the OFDM symbols at the time of switching from DL to UL transmission are configured as a guard period (GP).

<Analog Beamforming>

Since wavelength in the millimeter wave (mmW) band is very short, it becomes possible to install multiple antennas on the same area. In other words, in the 30 GHz band, the corresponding wavelength is about 1 cm, and a total of 100 antenna elements may be installed in a two dimensional array form on a panel of 5 cm×5 cm size with spacing of 0.5 lambda. Therefore, in the mmW band, multiple antenna elements may be used to improve the beamforming (BF) gain, thereby extending coverage or increasing throughput.

In this case, if a transceiver unit (TXRU) is used to allow adjustment of transmission power and phase for each antenna element, independent beamforming may be realized for each frequency resource. However, installing TXRUs in all of 100 or more antenna elements raises an effectiveness issue in terms of cost. Therefore, a method for mapping multiple antenna elements to one TXRU and adjusting a beam direction by using an analog phase shifter is being considered. However, this kind of analog beamforming (BF) method has a disadvantage that frequency selective BF is not possible because only one beam direction may be implemented over the whole band.

As an intermediate solution between digital BF and analog BF, hybrid BF employing B TXRUs, the number of which is smaller than the number of antenna elements, Q, may be taken into consideration. In this case, in spite of variations due to how B TXRUs are connected to Q antenna elements, the number of beam directions for simultaneous transmission may be limited below B.

<Analog Beamforming-2>

In the NR system, a hybrid beamforming scheme is emerging, which combines digital beamforming and analog beamforming when a plurality of antennas are used. At this time, analog beamforming (or RF beamforming) refers to an operation of performing precoding (or combining) in the RF block.

In the hybrid beamforming scheme, the baseband block and the RF block perform precoding (or combining) respectively, according to which an advantage is obtained that performance comparable to that of digital beamforming is achieved while the number of RF chains and the number of D/A (or A/D) converters are reduced.

For the sake of convenience, the hybrid beamforming structure is assumed to be composed of N transceiver units (TXRUs) and M physical antennas. Then, digital beamforming for L data layers to be transmitted from the transmitter block may be expressed by an N-by-L matrix. N transformed digital signals are subsequently converted to analog signals through the TXRUs, after which analog beamforming expressed by an M-by-N matrix is applied.

For the convenience of understanding, the hybrid beamforming structure from perspectives of an TXRU and a physical antenna may be illustrated as follows.

Figure 10:
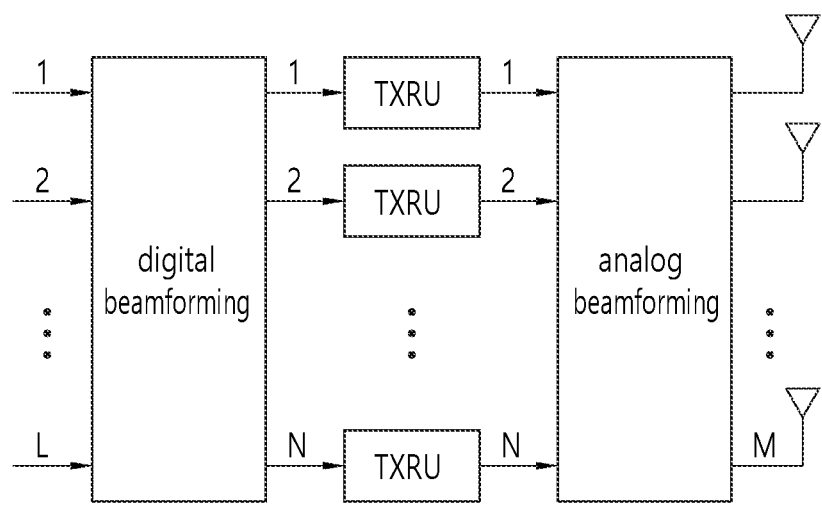
FIG. 10 illustrates a hybrid beamforming structure from perspectives of a TXRU and a physical antenna.

FIG. 10 illustrates a hybrid beamforming structure from perspectives of a TXRU and a physical antenna.

According to the example of FIG. 10, the number of digital beams is L, and the number of analog beams is N. Furthermore, the NR system is designed so that a base station may change analog beamforming in symbol units to support more efficient beamforming for a UE located in a particular region.

In addition, the example of FIG. 10 assumes to use a scheme in which the NR system adopts a plurality of antenna panels capable of independent hybrid beamforming when specific N TXRUs and M RF antennas are defined as one antenna panel.

As described above, suppose the base station uses a plurality of analog beams. Since an analog beam suitable for signal reception may differ for each UE, a beam sweeping operation is considered, which converts a plurality of analog beams to be applied by the base station in a specific subframe (SF) on the symbol basis at least for a synchronization signal, system information, and a paging signal so that every UE may have an opportunity of reception.

In what follows, the beam sweeping operation with respect to a synchronization signal and system information during a downlink transmission process will be described in more detail with reference to a related drawing.

Figure 11:
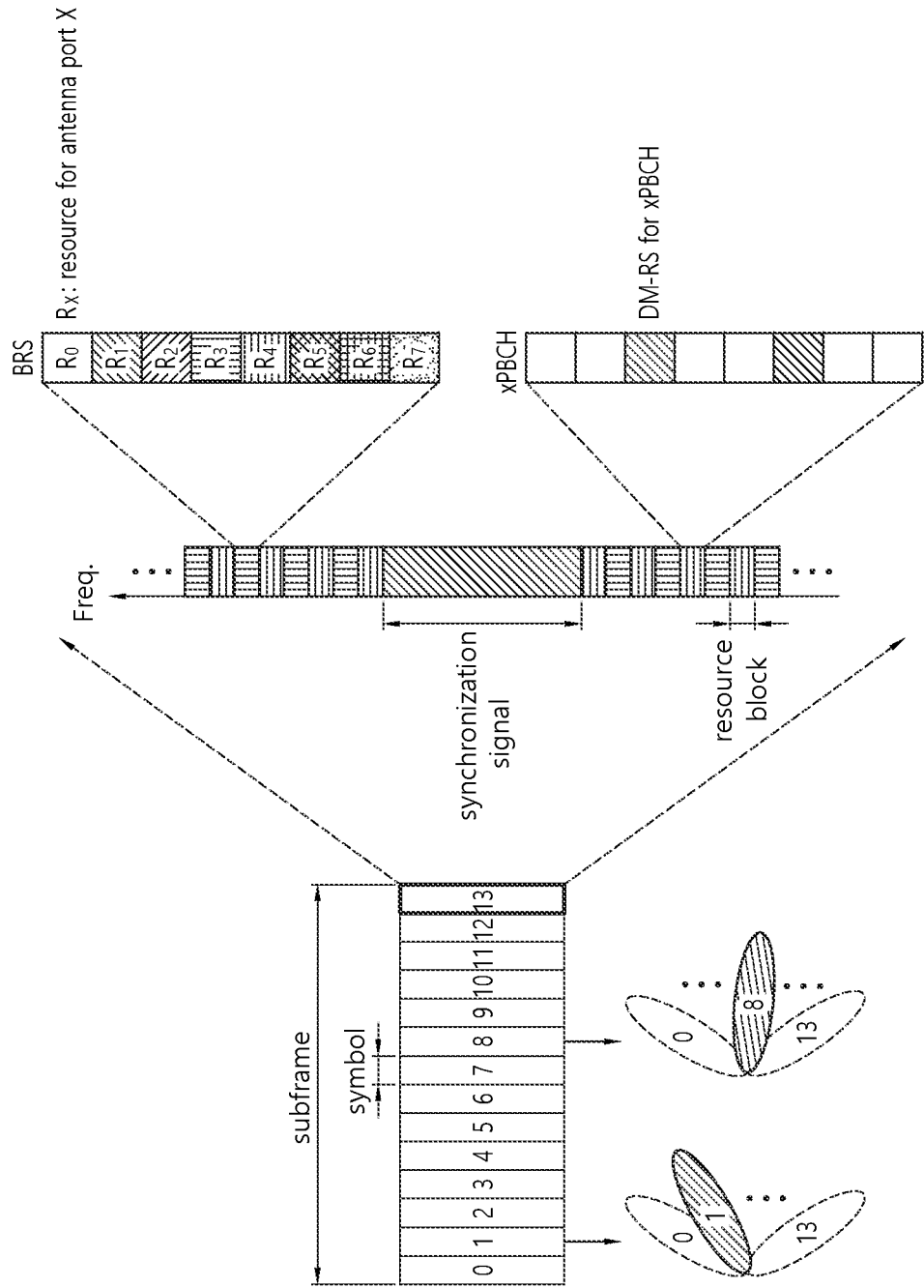
FIG. 11 illustrates one example of a beam sweeping operation with respect to a synchronization signal and system information during a downlink transmission process.

FIG. 11 illustrates one example of a beam sweeping operation with respect to a synchronization signal and system information during a downlink transmission process.

According to FIG. 11, a physical resource (or a physical channel) to which system information of the NR system is transmitted in a broadcasting scheme may be called a physical broadcast channel (xPBCH).

Analog beams belonging to different antenna panels within one symbol may be transmitted simultaneously, and a Beam RS (BRS) may be adopted, which is a reference signal (RS) transmitted by applying a single analog beam (corresponding to a specific antenna panel) thereto to measure a channel for each analog beam.

The BRS may be defined for a plurality of antenna ports, and each antenna port of the BRS may correspond to a single analog beam. At this time, different from the BRS, the synchronization signal or the xPBCH may be transmitted by applying all the analog beams within an analog beam group thereto so as to be well received by an arbitrary UE.

Hereinafter, the present disclosure will be described.

An NR PDCCH has complexity higher than an LTE PDCCH due to the use of a demodulation reference signal (DMRS), configuration of multiple control resource sets (CORESETs) and search space sets, and performing wireless communication based on higher complexity may increase power consumption to cause a decrease in a UE operation time.

Therefore, the present disclosure proposes a power saving scheme from an NR-PDCCH perspective. The methods proposed below may be implemented alone or in combination.

The methods proposed below may operate in conjunction with a PDCCH mapping rule. In this case, a PDCCH mapping rule applied in a general case and PDCCH mapping rule applied in a power saving mode may be separately defined, and the UE may change the PDCCH mapping rule applied according to a current mode.

For example, in the general mode, blind decoding (BD) is performed on all common search spaces (CSSs), and in a BD/CCE limit, mapping may be performed in units of search space (SS) sets, starting from a UE-specific search space (USS) of a low index, for remaining capability, except for BD/CCE required for CSS.

Meanwhile, in the power saving mode, AL-based PDCCH mapping, CORESET-based PDCCH mapping, and information-based PDCCH mapping proposed below may be applied. Alternatively, in the power saving mode, the PDCCH mapping rule proposed below may be additionally applied after the existing PDCCH mapping rule is applied. This may be interpreted such that management is performed on the BD/CCD limit in the general PDCCH mapping rule and an additional dropping rule is applied for power saving in the PDCCH mapping rule for power saving.

Additionally, the following documents may be applied for each set of slots defined in advance or indicated by a network. The network may signal one or a plurality of slot sets to each UE (or UE group) in consideration of resource usage in a cell and may inform whether a power saving mode is applied in each slot set.

Hereinafter, AL adaptation, BD/CCE limit configuration, dynamic CORESET/SS set on/off, and the like will be described as a method for reducing complexity due to channel decoding and/or channel estimation.

The contents of the present disclosure to be applied below may be comprehensively described from the viewpoint of a UE as shown in the drawing below.

Figure 12:
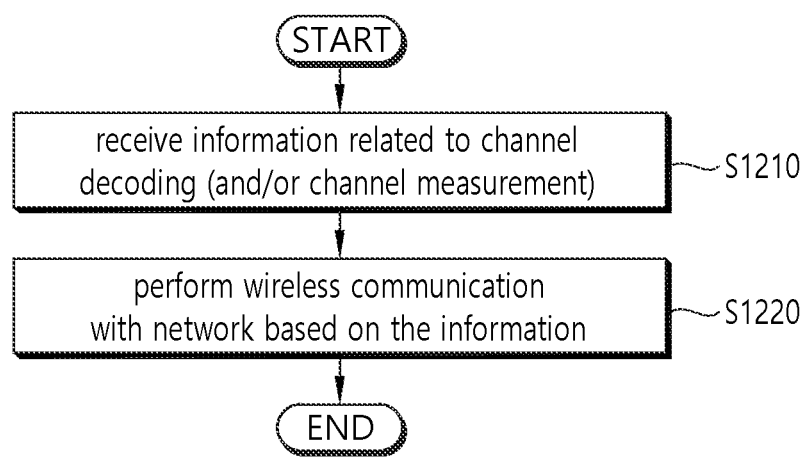
FIG. 12 is a flowchart of a power saving method according to an embodiment of the present disclosure.

FIG. 12 is a flowchart of a power saving method according to an embodiment of the present disclosure.

Referring to FIG. 12, the UE may receive information related to channel decoding (and/or channel measurement) (from a network) (S1210). Alternatively, the information related to channel decoding (and/or channel measurement) may be determined by the UE.

Here, the above information (i.e., information related to channel decoding (and/or channel measurement)) may refer to a control channel decoding history of the UE. Details here will be described later. Alternatively, the above information may refer to a BD/CE limit or the like. Details here will also be described later. Alternatively, the above information may refer to information indicating whether updating is signaled. Details here will also be described later. Alternatively, the above information may refer to downlink control information (DCI). Details here will also be described later.

The UE may perform wireless communication with a network based on the information (S1220). Here, a specific example in which the UE performs wireless communication with the network based on the above information will be described later.

Each step in FIG. 12 may be performed by a processor of the UE. Specifically, each step may be performed by the processor of the UE to be described later. In addition, a physical signal of each step may be transmitted/received by a transceiver of the UE under the control of the processor. Control information, data, etc. transmitted through a PDCCH and a PDSCH may be processed by the processor of the UE. In order to transmit/receive a physical layer signal, the processor may include a configuration in a processor to be described later.

Hereinafter, methods to which examples of the present disclosure are applied will be described in detail.

1. Method 1) AL Adaptation

In the NR system, the UE may receive a signal from a network (e.g., a BS) for configuration of a plurality of search space sets, and the corresponding configuration may include an aggregation level AL that should be monitored in the search space sets, the number of PDCCH candidates for each AL, and the like.

In the control channel, the AL plays a role of determining a coding rate of control channel transmission/reception. Here, since there is no method for indicating a coding rate in advance unlike the PDSCH in which MCS or the like is indicated from the PDCCH, the UE designates a plurality of ALs and undergoes a process of blind-decoding candidates of the corresponding ALs.

However, in general, since a similar channel condition may be maintained in an adjacent time domain resource, it may be inefficient for the UE to perform blind decoding on all configured ALs.

In other words, if the AL of the PDCCH successfully received in the current channel situation is a specific value, it is highly likely that the AL is near the specific value even in a next decoding situation, so it may be inefficient for the UE to perform blind decoding on all ALs.

Therefore, the present disclosure proposes that the UE should select an AL to perform blind decoding based on the UE's control channel decoding history, etc., and the selected AL(s) may be part or all of the AL(s) set by the network.

As an example, a UE, which has successfully decoded an AL2 candidate in a previous slot, may perform blind decoding only on an AL that has successfully decoded in a later slot and an AL before and after the AL. In an example, the UE may perform blind decoding only on ALs 1, 2, and 4. As in the example, the UE may select an AL before or after a successfully decoded AL or attempt to decode only "X" ALs after (or before) the successfully decoded AL. In this case, X may be defined in advance or indicated by the network, and the successfully decoded AL may also be included.

In order to additionally consider a channel condition, a time point when an AL set selected by method 1) is applied and a time during which the selected AL set is maintained may be defined, and blind decoding may be performed on all the set ALs after a corresponding period.

For example, assuming that the time during which the proposed AL adaptation is applied is the Y slot(s) and a round trip time (RTT) is Z slot(s), the UE which has received a PDSCH linked with a successfully decoded PDCCH in a slot "n" (or which has transmitted the PUSCH/PUCCH) may apply the AL adaptation proposed in the present disclosure from "n+Z" to slot "x+Z+Y−1". In an example, the RTT represents a time required for the UE to receive retransmission for the corresponding PDSCH, starting from a time point when the UE receives the PDSCH, and it may refer to a time for the network to recognize when the corresponding UE successfully performs decoding and apply AL adaptation based on the corresponding result. Here, the value Y may be defined in advance or indicated by the network.

Additionally, method 1) may be applied for each CORESET and/or SS set. As mentioned above, the proposed AL adaptation may operate based on the assumption that the channel condition may be maintained for a certain period of time.

However, since each CORESET in the NR may have a different transmission configuration indicator (TCI) state (QCL assumption), it is difficult to assume the same channel condition in different CORESETs, and since each SS set may be configured to monitor a different DCI (or RNTI), a coding rate for the same AL may be set to be different for each SS set.

Therefore, it may be preferable that the AL adaptation proposed in the present disclosure is performed independently for the (CORESET and/or) SS set. That is, AL adaptation may be performed for (each CORESET and/or) each SS set.

AL adaptation may be applied step by step based on history.

For example, if decoding on an AL 8 candidate is successful, one of the AL 1 candidates having a coding rate most different from AL 8 (e.g., the highest candidate index) may be skipped, and if decoding on an AL candidate lower than AL 8 is successful in decoding of slots, monitoring on the skipped candidate may be performed on subsequent slots.

Additionally, AL adaptation may be implemented by the network.

That is, the network may instruct the corresponding UE to change the AL(s) configured to be monitored and the number of candidates for each AL based on the number of times of DCI missing of the UE, a measurement report of the UE, etc. Here, the change in the monitored AL(s) may be indicated by L1 signaling or MAC CE to quickly cope with channel conditions (i.e., to change AL(s) within a short period of time).

Additionally, when AL adaptation is applied, the network may operate as follows.

When the network receives an ACK/NACK for a PDSCH linked to a specific DCI transmitted to the UE, the network may assume that the UE has successfully decoded the DCI and select AL in next transmission based on the AL applied when the corresponding DCI was transmitted.

For example, when an ACK/NACK for the PDSCH linked to the DCI transmitted in AL4 is received, the network may select a transmission candidate from among the candidates of AL4 and AL8 in the next DCI transmission of the corresponding CORESET and/or SS set. This may be interpreted such that the network recognizes that the UE does not perform blind decoding on the AL1 and 2 candidate(s).

2. Method 2) Configurable BD/CE Limit

In the NR, limits of blind decoding and channel estimation that may be performed in one slot are defined in order to consider decoding and channel estimation complexity of the UE.

The blind decoding may be counted as the number of candidates on which the UE performs blind decoding, and the channel estimation may be counted as the number of CCEs on which the UE should perform channel estimation in a corresponding slot.

The UE may derive the number of BDs and CCEs in the corresponding slot in consideration of the SS set and CORESET configured in each slot, and if any of the derived values exceeds a limit, the UE may skip monitoring on some of the configured SS set.

In the present disclosure, it is proposed to reduce complexity of the UE and reduce power consumption by defining a number of BDs and CCEs defined for each numerology in the specification. This may be signaled explicitly or may be determined implicitly by the UE. The options below may be implemented alone or in combination.

Option 1) Explicit Signaling of BD/CE Limit

Since the network may know scheduling information on each UE in advance, it may signal the BD/CE limit for each UE in consideration of the corresponding information.

As an example, if UE-dedicated data transmission is not scheduled, it may be configured such that the network may designate the BD/CE limit as a small value so that the UE does not perform blind decoding on all or some of the USSs.

Conversely, if there is a large amount of data to be transmitted to the UE or to be received from the UE, scheduling flexibility may be increased by setting a large BD/CE limit.

Option 2) Implicit Decision of BD/CE Limit

The UE may set the BD/CE limit in consideration of a channel condition between the network and the UE, a status of the UE (e.g., a DRX-related timer, pre-designated UL/DL transmission/reception), etc.

To this end, a number of limits may be defined for each neurology in advance (or a number of limits may be signaled by the network), and the UE may adjust the number of candidates to perform BD/CE in the corresponding slot by setting a specific limit under the condition that the network and the UE have the same understanding.

As an example, if there is no PDCCH reception for a predetermined time, the UE may change the BD/CE limit to a smaller value.

As another example, in a region in which the probability that the UE receives the PDCCH is relatively low (e.g., a region of an active time with only an on-duration timer in a DRX operation), PDCCH mapping may be performed on the assumption of a small value of BD/CE limit.

Meanwhile, a method in which the network more clearly reduces the number of BD/CEs (apart from options 1 and 2) may also be used. For example, the network may indicate, to the UE, a CORESET and an SS set (among the CORESET/SS sets configured for the UE), an AL, and all or some of candidates to be monitored (i.e., on which monitoring is to be performed) after receiving the corresponding DCI through DCI, PDSCH, etc. This may refer to that the BD/CCE to be monitored by the network is reduced, not a method of reducing the BD/CCE limit. In this case, there is an advantage in that scheduling of the network may be clearly reflected.

Hereinafter, a method for the network to more clearly reduce the number of BD/CEs will be described with reference to the drawings. Here, in the contents of the present disclosure to be described with reference to the accompanying drawings, the configuration of the present disclosure described above and the configuration of the present disclosure to be described later may be combined.

Here, the method for reducing the number of BD/CEs in the network more clearly described above may be expressed as a method in which UE receives information related to monitoring (information related to reducing the range of a target to be monitored by the UE) from the network and performs monitoring based on the information related to monitoring, the target to be monitored may refer to, for example, the CORESET, SS set, AL, and all or some of PDCCH candidates to be monitored.

That is, CORESET/SS set/AL/CORESET/SS set/AL/candidate(s) to be actually monitored, among the CORESET/SS set/AL/candidate(s) indicated by RRC signaling such as CORESET configuration and/or SS set configuration may be indicated for the UE through DCI or the like.

Figure 13:
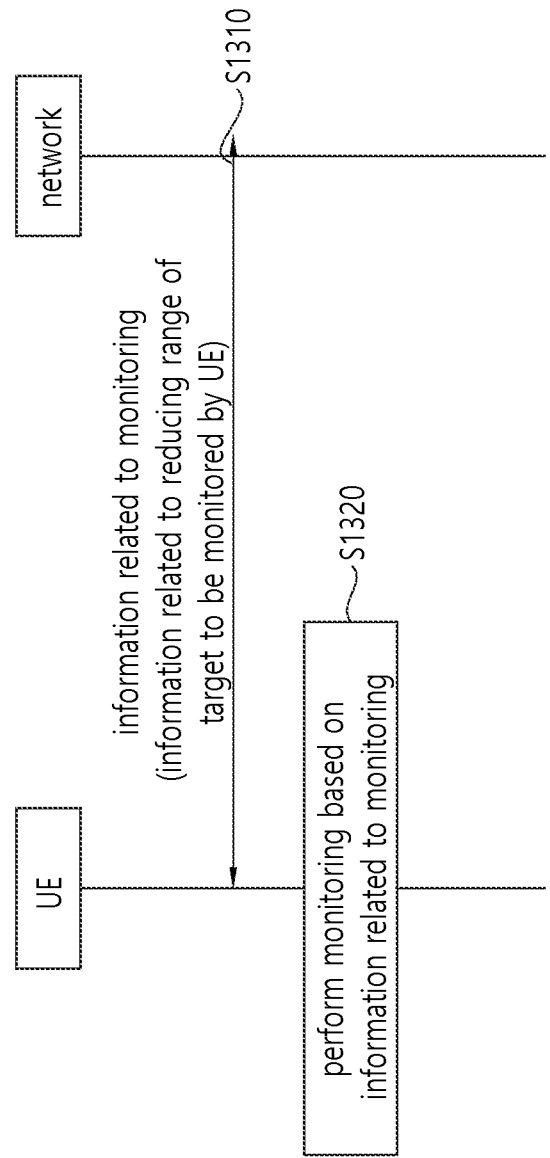
FIG. 13 is a flowchart illustrating a power saving method based on information related to monitoring according to an embodiment of the present disclosure.

FIG. 13 is a flowchart illustrating a power saving method based on information related to monitoring according to an embodiment of the present disclosure.

According to FIG. 13, the UE may receive information related to monitoring from a network (e.g., a B S) (S1310). Here, for example, the information related to monitoring may refer to information related to reducing the range of the target to be monitored by the UE, which may be interpreted as a process of dynamically determining the range of the target to be actually monitored in the configuration of monitoring indicated by RRC signaling for the UE.

A detailed description of how the UE receives information related to monitoring from a network (e.g., a BS) will be described later.

Thereafter, the UE may perform monitoring based on the information related to monitoring (S1320). Details of how the UE performs monitoring based on the information related to monitoring will be described later.

Here, for example, the UE may receive information on monitoring candidates from the network, and the UE may perform monitoring on some of the monitoring candidates based on the information related to monitoring.

In this case, the information on the monitoring candidates may refer to CORESET/SS set/AL/candidate(s) indicated by RRC signaling, such as CORESET configuration and/or SS set configuration.

In addition, some of the monitoring candidates may refer to, for example, CORESET/SS set/AL/candidate(s) on which monitoring is to be actually performed.

In other words, as described above, the CORESET/SS set/AL/candidate(s) on which monitoring is to be actually performed, among the CORESET/SS set/AL/candidate(s) indicated by RRC signaling, such as CORESET configuration and/or SS set configuration, may be indicated through DCI for the UE.

For example, the information related to monitoring may be transmitted based on DCI or a PDSCH. As an example, after the UE receives the DCI based on the information related to monitoring, all of some of the CORESET, the SS set, the AL, or the candidate on which the monitoring is to be performed may be indicated by the network for the UE. The information related to monitoring may be expressed as indicating the CORESET, the SS set, the AL or all or some of the candidates on which the monitoring is to be performed after the UE receives the DCI.

Here, for example, the information related to monitoring (e.g., information related to reducing the range of the target to be monitored by the UE) may include information indicating whether to turn on or off at least one CORESET. And/or, the information related to monitoring (e.g., information related to reducing the range of the target to be monitored by the UE) may include information indicating whether to turn on or off at least one SS set.

For example, in the UE, at least one CORESET may be configured by explicit signaling of the network or an implicit decision of the UE, and the UE may turn on or off monitoring on the at least one CORESET based on the information related to monitoring.

As an example, when the information related to monitoring indicates ON of the at least one CORESET, the UE may perform monitoring on the at least one CORESET, and when the information related to monitoring indicates OFF of the at least one CORESET, the UE may skip monitoring on the at least one CORESET. Here, skipping monitoring on the CORESET may refer to skipping monitoring on (one or multiple) SS sets linked to the corresponding CORESET.

As an example, at least one SS set may be configured in the UE by explicit signaling of the network or implicit decision of the UE, and the UE may turn on or off monitoring on the at least one SS set based on the information related to monitoring.

Hereinafter, a method of dynamically turning on/off a CORESET and a method of dynamically turning on/off an SS set will be described in more detail through method 3 below.

3. Method 3) Dynamic CORESET On/Off

In the NR, characteristics that significantly affect reception performance of a control channel, such as CCE-to-REG mapping, an interleaver size, and the like in the corresponding CORESET are defined by the CORESET configuration, and the corresponding characteristics are may be affected by a channel condition, a scheduling load, and the like.

That is, when a channel environment is changed, control channel transmission/reception performance in the corresponding CORESET may be degraded if the corresponding characteristic cannot be considered in a specific CORESET.

However, since the CORESET configuration may be changed by RRC signaling, it may be difficult to dynamically change reflecting the channel condition.

Therefore, the present disclosure proposes determining ON/OFF of a CORESET configured by explicit signaling of the network or by implicit decision of the UE.

As an example, in a case where the network transmits the PDCCH using a specific CORESET but there is no reaction from the UE (e.g., uplink transmission linked to DL assignment/UL grant transmitted in the corresponding CORESET), the network may instruct the UE to skip monitoring on the corresponding CORESET. This may be performed by L1 signaling to dynamically set CORESET ON/OFF. For example, ON/OFF for the CORESET defined in a corresponding BWP may be signaled by introducing a 3-bit field to each DCI.

As another example, if the UE does not receive DCI for a certain period of time or longer in a specific CORESET, the UE may stop monitoring on the corresponding CORESET, and the monitoring of the corresponding CORESET may be stopped for a certain period of time or whether to perform monitoring may be configured by the network.

In addition, a measurement for each CORESET may be introduced. The UE may measure RSRP, RSRQ, SINR, etc. for the DCI successfully received in each CORESET and report the measured RSRP, RSRQ, SINR, etc. to the network. Alternatively, if the measured values are below a certain level, the network may request reconfiguration of the corresponding CORESET.

The dynamic CORESET on/off proposed in the present disclosure may operate as a dynamic SS set on/off in the same manner. That is, SS set on/off using L1 signaling may be proposed. For example, monitoring for each SS set configured for the UE in a power saving signal/channel may be turned on/off.

This may be necessary to reflect that DCI are classified into a DCI which can be received and a DCI which is difficult to receive according to coding rates when monitoring is performed on different DCI sizes for each SS set. Or, it may be necessary for the UE to monitor only a necessary SS set according to types of information that the network wants to send to a specific UE.

According to method 3, a likelihood that the UE performs monitoring even on a CORESET (or SS set) other than a decodable CORESET (or SS set) is lowered. Therefore, the UE according to this method may perform monitoring only on some CORESET (or SS set) rather than all of the CORESETs (or SS sets) configured in the UE, thereby preventing the UE from unnecessarily consuming power.

4. Method 4) Information-Based CORESET/SS Set Selection

It is desirable to avoid blind decoding and channel estimation for information that does not need to be received because it causes unnecessary power consumption. Therefore, the present disclosure proposes that BD/CE for information in which whether to be update is signaled should not be performed in an area which has not been updated.

For example, in the case of system information (SI), SI update information may be received by paging. Thus, once the UE receives the SI, the UE may skip monitoring on an SS set scheduling the corresponding SI until whether to update the corresponding information is signaled. Meanwhile, the network may transmit the SI at every predetermined period (periodicity for a UE that newly enters or the like through initial access.

The present disclosure may be used not only for the purpose of power saving but also to increase a BD/CE opportunity for a search space set having a low priority such as USS.

In the case of power saving, that is, when the present disclosure is used for the purpose of reducing complexity of BD/CE, whether the UE performs monitoring may be performed by the UE regardless of whether the network recognizes it.

Meanwhile, when the present disclosure is used to increase a monitoring opportunity for a low-priority SS set in the PDCCH mapping rule, the same understanding between the network and the UE for a section to which the present disclosure is applied may be required.

That is, since the CORESET, SS set, and candidates monitored by the UE in a region to which the present disclosure is applied and a region to which the present disclosure is not applied may be changed, the UE may report information on validity of the information to the network. For example, when SI updating is indicated by paging, the UE that has received a new SI may report to the network that SI updating has been applied through PUSCH/PUCCH.

<Power Saving Mode>

Meanwhile, whether to apply the power saving method(s) proposed above (and/or to be described later) may be determined according to a change in mode (e.g., normal mode/power saving mode) or whether to apply the corresponding methods may be determined by signaling of the network.

That is, a status of the UE is divided into the power saving mode and a normal mode, so that a setting for each mode may be applied in the corresponding mode. For example, the classification of the modes may indicate that the network enters the power saving mode (which includes a response to a request of the UE) or a configuration for the power saving mode (for CORESET/SS set, SCell, BWP, etc.) may be applied in a specific situation (e.g., a power saving signal/situation set to monitor channel, etc.) For example, in the specific situation, the power saving mode is not separately defined, and if a DCI including an indicator for a wake up signal (WUS) or a power saving scheme is indicated to monitor, the configuration for the power saving mode may be applied.

When the power saving mode is additionally defined, the power saving mode may be operated by all or some of the following operations.

1. The UE may report the ability to operate in the power saving mode to the network. When a multiple power saving mode (e.g., a plurality of saving modes (or levels) may be defined by a power saving degree, a power saving operation, etc.) is defined, the UE may report a power saving level or type that the corresponding UE may be able to support.

2. Based on the power saving report of the UE, (or by the determination of the network without reporting), the network may indicate an application timing of the power saving mode and a configuration for power saving (for each UE) to the UE by higher layer signaling (e.g., RRC signaling, etc.).

A. In addition, the configuration for the power saving mode may be operated by a predefined configuration without an indication from the network. For example, in the power saving mode, it may operate in the BWP, CORESET, and SS set configuration (for predefined power saving purposes).

3. The UE whose power saving mode is triggered by activation of the power saving mode or by a specific condition may perform a subsequent operation based on a network configuration or a predefined power saving configuration. Whether to continue the power saving mode may be set by the network or may be predefined to change to the normal mode under a specific condition (e.g., beam failure detection, timer expiration).

4. The network may perform an operation for power saving on the UE which has entered the power saving mode. For example, the network may transmit the PDCCH only in the CORESET for the power saving purpose and may transmit the PDCCH only in specific AL(s) according to a power saving mechanism.

In the following, additional proposals for the above contents and a new power saving method are proposed.

In the following, a case where a power saving mode specific operation is mainly triggered by a mode change has been described, but this may include a case in which the corresponding operation is performed according to an indication from the network.

In Addition to 'Method 1) AL Adaptation' Described Above,

In method 1) above, it is proposed that the AL(s) for the UE to perform blind decoding may be changed by the decoding history.

Such AL adaptation may be defined to operate only in a corresponding mode when the power saving mode is defined or may be defined to always operate regardless of mode. As another method of performing AL-based power saving, an AL set for normal mode and power saving mode may be separately configured.

When indicating the configuration of the SS set, the network may separately configure the AL set to be applied in different modes.

Alternatively, the AL set for the power saving mode may include a subset of the AL set belonging to the corresponding SS set configuration, and which AL belongs to the corresponding subset may be defined in advance.

For example, it may be defined in advance to perform only blind decoding on the candidate(s) allocated to the largest AL among the AL set in the power saving mode.

As another method, it is possible to reduce the number of candidates per AL in the SS set configuration.

For example, in the power saving mode (for normal mode purposes), only a candidate with the lowest index or the highest index among the candidates allocated to each AL may be blind-decoded or an index of a candidate to be blind-decoded in conjunction with a UE ID may be selected.

In Addition to 'Method 2) Configurable BD/CE Limit',

Similar to the above AL adaptation, different limits may be applied to the configurable BD/CE limit according to the power saving mode.

For example, the network may indicate the BD/CE limit for each numerology applied in the power saving mode and the normal mode using higher layer signaling, or the BD/CE limit by mode may be predefined according to numerology.

When a mode change occurs according to an indication of a network or according to a predefined method, the UE may perform blind decoding under the assumption of PDCCH mapping by applying a BD/CE limit for each mode.

As another method of reducing power consumption using the BD/CE limit, a BD/CE limit for each cell and/or a BD/CE limit for each BWP may be used.

The BD/CE limit for the current carrier aggregation (CA) case is defined for each numerology, and in a case where there are multiple cells configured with the same numerology, a non-CA limit is assumed for each cell.

In this case, there is a disadvantage in that it is difficult to apply an adaptive power saving scheme according to operation for each cell. In addition, in the case of the BWP, it may be desirable to apply a BD/CE limit for each BWP in order to perform efficient PDCCH transmission/reception according to a frequency domain BW of the BWP.

Accordingly, in the present disclosure, it is proposed to configure or predefine the BD/CE limit for each cell and/or for each BWP. This may include a limit configuration according to numerology.

When this is linked with power saving, the BD/CE limit for each cell and/or for each BWP may be applied only in the power saving mode or only according to the indication of the network.

For example, a BWP operating in the power saving mode may be defined by higher layer signaling of a network (or by a predefined definition), and in this case, a BD/CE limit for each BWP may be applied.

To this end, the network may configure a BWP for power saving mode and may configure the BD/CE limit in the corresponding BWP.

When the UE is configured in the power saving mode by the network or is switched to the power saving mode by an implicit rule, the UE may perform blind decoding according to a PDCCH mapping rule by applying the BD/CE limit defined for the BWP in the corresponding BWP indicated by the network.

In addition, when the power saving mode may be applied for each cell, the BD/CE limit of each cell may be changed based on the mode. This may be implemented through a method in which the network indicates through higher layer signaling or the like or a method in which the UE changes the limit using a predetermined ratio or the like according to a mode change.

As an example, when the BD/CE limit of each cell follows the non-CA limit, a value obtained by multiplying the non-CA limit by a specific ratio (e.g., 0.5) may be assumed as the limit in a cell operating in the power saving mode.

In Addition to 'Method 3) Dynamic CORESET On/Off' Described Above,

CORESET on/off may also be replaced by CORESET applied in power saving mode. To this end, the network may configure a CORESET that may be monitored in the power saving mode for each cell and/or for each BWP. Here, the CORESET(s) for the power saving mode may be selected from among the CORESET configured in the corresponding BWP or may be configured separately from the CORESET configuration in the normal mode.

As another method for the network to turn on/off the CORESET, the corresponding CORESET may be turned on/off using a specific parameter in the CORESET configuration.

For example, each CORESET configuration includes a TCI state (i.e., spatial QCL information) linked with the corresponding CORESET, which may be interpreted such that monitoring on the corresponding CORESET is stopped if the TCI state is a value which is not available.

As an example, the TCI state of the CORESET is configured by selecting it from a TCI pool signaled for the PDSCH, etc., and if the TCI state of the CORESET is configured by a value not included in the TCI pool, the UE may interpret it as a deactivation message for the corresponding CORESET and stop monitoring.

Here, stopping monitoring on the CORESET may be interpreted as stopping monitoring of the SS set(s) linked with the corresponding CORESET.

In addition, when a beam failure is detected and recovery is performed thereon, the UE performs a RACH procedure for a new beam and monitors a response to the RACH in a BFR CORESET.

Here, the existing beam-based PDCCH monitoring may also be performed, which may not be desirable from the viewpoint of power saving. Therefore, in the present disclosure, it is proposed not to perform monitoring on the CORESET (e.g., CORESET linked to the existing beam(s) in which beam failure is declared) other than the BFR CORESET in a case where the UE operates in the power saving mode and monitors the BFR CORESET in a BFR procedure.

Accordingly, the network may perform the BFR procedure, and the UE operating in the power saving mode may perform PDCCH/PDSCH scheduling under the assumption that only BFR CORESET is monitored.

5. Method 5) Power Saving Mode Specific SCell(s), BWP(s)

The network may additionally instruct each UE to configure a SCell that operates when a power saving mode is applied in a CA operation.

The power saving mode specific SCell(s) may include a subset of a SCell list configured for the normal mode or a SCell list in which the BW of each SCell is reduced in the normal mode SCell configuration. Alternatively, SCell configuration for power saving mode purposes may be defined in advance.

For example, in the power saving mode, a predetermined number of SCells may be selected from among SCells defined in the normal mode, and the SCells in the power saving mode may be selected using an index (e.g., from a lower index). Here, since adjustment on a CA operation and transmission/reception of important information may occur in the PCell, it may be assumed that there is no change in configuration according to modes.

A BWP in the power saving mode may also be defined in a bandwidth part.

In the case of a BWP, a configuration suitable for power saving (e.g., small bandwidth, small number of CORESET(s)/SS set(s)) may be configured for the existing default BWP so that it is defined to operate in the default BWP in the power saving mode.

Meanwhile, the number of BWPs per cell is limited to 4, and if all 4 BWPs may be used for various diversity effects in the normal mode, the use of the default BWP for the power saving mode purpose may cause performance degradation in the normal mode.

Therefore, the present disclosure proposes an document in which the network configures a BWP setting configuration for operation in the power saving mode (which may include selecting some of the BWPs in the normal mode) and the UE operates based on the corresponding BWP configuration when operating in the power saving mode.

Here, since the BWP for each mode may be assumed only in the corresponding mode, it may be assumed that the BWP(s) for the power saving mode is not included in 4 BWP restrictions per cell. That is, a BWP limit per cell may be applied for each mode.

In addition, the BWP limit in the power saving mode may be defined separately from the BWP limit in the normal mode, such as one or two.

<Shadow Bandwidth Part>

In general, when BWP changing occurs, the UE requires latency ( ) for applying the corresponding BWP configuration (e.g., applying RF setting, frequency/time offset (frequency/time offset) correction, CORESET/SS set configuration).

In the present disclosure, in order to reduce power consumption and the like occurring in such a process, it is proposed to introduce a shadow BWP.

Here, the shadow BWP may refer to a BWP for reducing power consumption and latency due to BWP changing and may refer to a BWP that does not operate in the normal mode and may operate only in the power saving mode. For example, the shadow BWP may refer to a BWP that the UE should assume, starting from a time of entering the power saving mode.

The shadow BWP may be interpreted as a BWP that is activated due to a mode change to the power saving mode, and here, it may mean that the BWP(s) in the existing normal mode is deactivated. The shadow BWP may be defined by all or some of the following features.

(1) The shadow BWP may be defined in connection with the BWP in the normal mode.

(2) The shadow bandwidth part may include a subregion of the BWP configured for the normal mode. As an example, a part of a specific bandwidth part of the normal mode may be defined as the shadow BWP.

To this end, the network may indicate a normal mode BWP linked to the shadow BWP, or a linkage between the shadow BWP and the normal mode BWP may be defined by a predetermined rule (e.g., the lowest indexed BWP, a default BWP, a first active BWP, etc.).

This may be interpreted as a method for minimizing a change in the RF setting (e.g., center frequency) for receiving the BWP.

(3) It may be assumed that, as numerology of the shadow bandwidth part, the same numerology as that of the normal mode BWP linked with the corresponding shadow BWP is applied. This may be interpreted as a method to reduce power consumption for correcting a change in frequency/time/phase offset due to a change in numerology.

(4) The CORESET/SS set configuration of the shadow BWP may include a subset of the CORESET/SS set configuration of the linked normal mode BWP. In this case, the subset may be indicated by the network or may be determined according to a predetermined rule.

6. Method 6) Power Saving Mode Specific TCI

In the power saving mode, only monitoring of the CORESET/SS set linked with a specific TCI state may be performed.

This may be interpreted as a method for reducing the CORESER/SS set on which the UE performs monitoring, and a CORESET/SS set to perform monitoring in the power saving mode may be determined by a network indication or by a predetermined rule (e.g., performing only monitoring on CORESET linked to SSB and an SS linked to the corresponding CORESET).

Similar to method 6, an SS set type for performing monitoring in the power saving mode may be defined.

For example, in the power saving mode, the UE may only perform monitoring on an SS set configured for CSS purposes among SS sets configured for an active BWP in the normal mode or a BWP for the power saving mode.

In this case, the network may transmit a UE-specific DCI to the UE using only a fallback DCI for PDCCH transmission by the USS in a power saving mode.

7. Method 7) Power Saving Mode Specific Capability

In the NR, various UE capabilities may be defined. For example, CA capability indicates on how many carriers processing may be performed at the same time, which may affect a PDCCH mapping rule or the like when monitoring a PDCCH. In addition, the processing capability may be defined for each procedure (e.g., PDCCH monitoring, CSI feedback), and the processing capability may be used as an index indicating a processing capability of the UE per unit time.

Based on this capability report, the network determines a frequency and density of information delivered to each UE.

In the present disclosure, in the case of the UE operating in the power saving mode, it is proposed to operate on the assumption of a specific capability (e.g., a capability corresponding to the lowest capability value).

For example, in the case of CA capability, in the power saving mode, the UE may operate based on the lowest capability (e.g., 4) regardless of actual capability of the UE. This may include a case where the UE does not operate in the CA operation in the power saving mode.

Similarly, as for processing (e.g., PDCCH monitoring, CSI measurement & reporting)-related capability, the UE may operate may be operated in the power saving mode on the assumption of a processing calculation amount per unit time as the lowest capability.

The network may determine whether to apply the actual capability of the UE or whether to assume the lowest capability regardless of actual capability of the UE based on the mode of the corresponding UE in relation to the capabilities of the UE, and perform an operation such as scheduling based on the corresponding mode.

8. Method 8) Power Saving Mode Specific RNTI Monitoring

In order to reduce power consumption due to PDCCH monitoring or the like, DCI, RNTI, etc. performing monitoring in the power saving mode may be defined. For example, it may be assumed that a message such as an SI-update delivered through paging is not monitored in the power saving mode.

As another example, in the power saving mode, only semi-static D/U assignment may be assumed. This may mean that a slot format change based on GC-PDCCH (SFI-RNTI) is not applied in the power saving mode, and this may mean that SFI-RNTI monitoring is not performed in the power saving mode.

Meanwhile, the UE may communicate with at least one of a mobile UE, a network, and an autonomous vehicle other than the device.

In addition, for example, the UE may implement at least one advanced driver assistance system (ADAS) function based on a signal for controlling movement of the device.

In addition, for example, the UE may switch a driving mode of the device from an autonomous driving mode to a manual driving mode or from the manual driving mode to the autonomous driving mode upon receiving a user input.

In addition, for example, the UE may perform autonomous driving based on external object information, and the external object information may include at least one of information on the existence of an object, location information of the object, distance information between the device and the object, and relative speed information.

In the example of FIG. 13 described so far, a flowchart of a method from a UE perspective and a processor of the device and a flowchart of a method from a BS perspective and a processor of the device may be described as follows.

Figure 14:
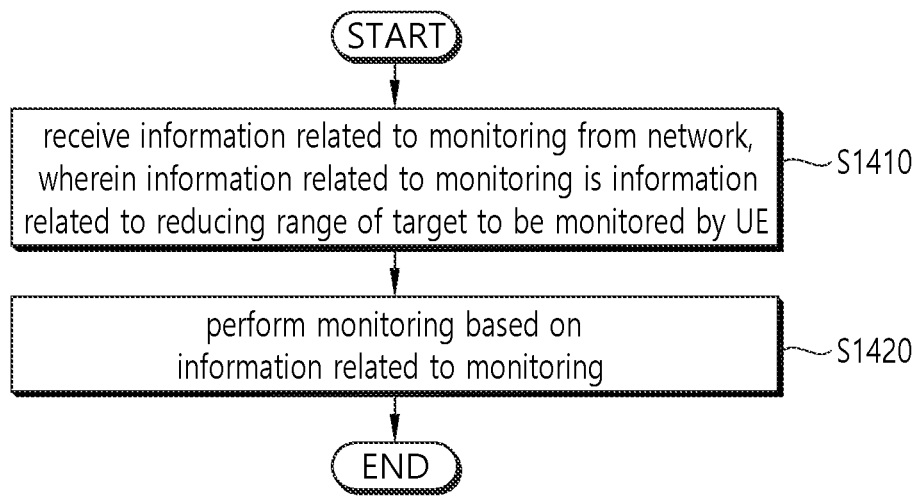
FIG. 14 is a flowchart illustrating a power saving method based on information related to monitoring from a UE perspective according to an embodiment of the present disclosure.

FIG. 14 is a flowchart illustrating a power saving method based on information related to monitoring from a UE perspective according to an embodiment of the present disclosure.

Referring to FIG. 14, the UE may receive information related to monitoring from a network (e.g., a BS) (S1410). Here, for example, the information related to monitoring may refer to information related to reducing the range of a target to be monitored by the UE.

Here, details of the UE receiving information related to monitoring from the network (e.g., the BS) is the same as described above, and thus, a redundant description of the duplicated contents will be omitted for convenience of description.

Thereafter, the UE may perform monitoring based on the information related to monitoring (S1420).

Here, details of the UE performing monitoring based on the information related to monitoring is the same as described above, and thus, a redundant description of the duplicated contents will be omitted for convenience of description.

Figure 15:
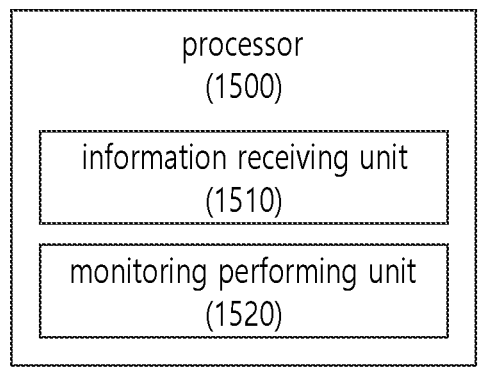
FIG. 15 is a block diagram schematically illustrating an example of a power saving device based on information related to monitoring from a UE perspective according to an embodiment of the present disclosure.

FIG. 15 is a block diagram schematically illustrating an example of a power saving device based on information related to monitoring from a UE perspective according to an embodiment of the present disclosure.

Referring to FIG. 15, a processor 1500 may include an information receiving unit 1510 and a monitoring performing unit 1520.

The information receiving unit 1510 may be configured to receive information related to monitoring from a network (e.g., a BS). Here, for example, the information related to monitoring may refer to information related to reducing the range of a target to be monitored by the UE.

Here, details of the UE receiving information related to monitoring from the network (e.g., the BS) is the same as described above, and thus, a redundant description of the duplicated contents will be omitted for convenience of description.

The monitoring performing unit 1520 may be configured to perform monitoring based on the information related to monitoring.

Here, details of the UE performing monitoring based on the information related to monitoring is the same as described above, and thus, a redundant description of the duplicated contents will be omitted for convenience of description.

Figure 16:
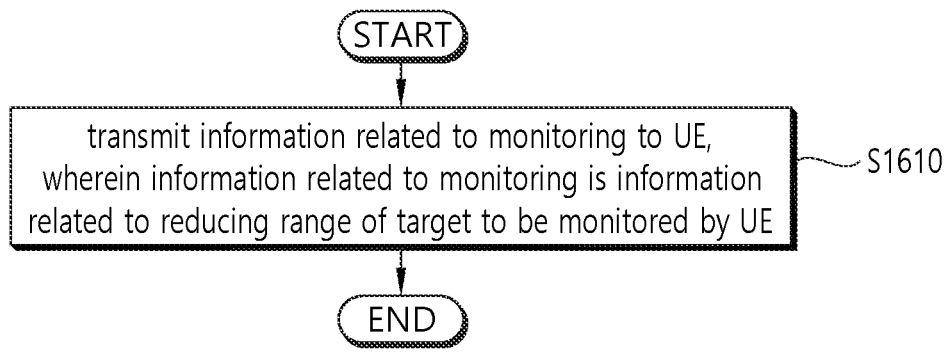
FIG. 16 is a flowchart illustrating a power saving method based on information related to monitoring from a BS perspective according to an embodiment of the present disclosure.

FIG. 16 is a flowchart illustrating a power saving method based on information related to monitoring from a BS perspective according to an embodiment of the present disclosure.

According to FIG. 16, the BS may transmit information related to monitoring to the UE (S1610). Here, for example, the information related to monitoring may refer to information related to reducing the range of a target to be monitored by the UE.

Here, details of the BS transmitting information related to monitoring to the UE is the same as described above, a redundant description of the duplicated contents will be omitted for convenience of description.

Figure 17:
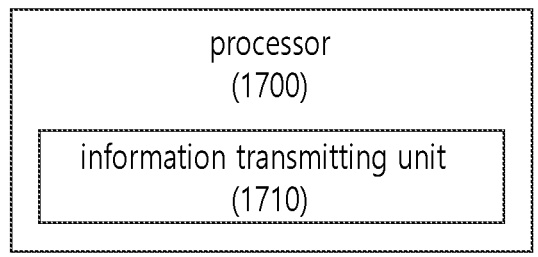
FIG. 17 is a block diagram schematically showing an example of a power saving device based on information related to monitoring from a BS perspective according to an embodiment of the present disclosure.

FIG. 17 is a block diagram schematically showing an example of a power saving device based on information related to monitoring from a BS perspective according to an embodiment of the present disclosure.

Referring to FIG. 17, a processor 1700 may include an information transmitting unit 1710.

The information transmitting unit 1710 may be configured to transmit information related to monitoring to the UE.

Here, for example, the information related to monitoring may refer to information related to reducing the range of a target to be monitored by the UE.

Here, details of the BS transmitting the information related to monitoring to the UE is the same as described above, and thus, a redundant description of the duplicated contents will be omitted for convenience of description.

<Channel Quality Measurement and Report for Control Channel>

In the above, AL adaptation, BD/CCE limit configuration, and dynamic CORESET/SS set on/off, etc. are proposed as a method for reducing the complexity due to control channel decoding, Hereinafter, a method of measuring and reporting a control channel is proposed in order to efficiently apply the schemes proposed above.

The contents of the present disclosure to be applied below may be comprehensively described from a UE perspective as shown in the drawing below.

Figure 18:
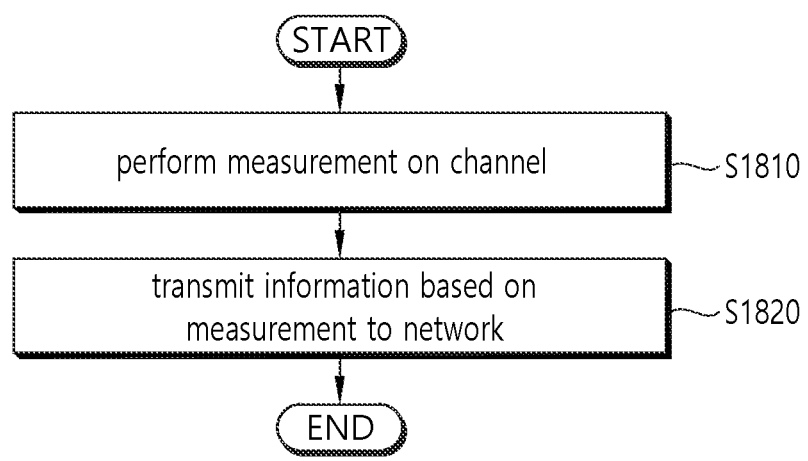
FIG. 18 is a flowchart of a method for performing measurement and reporting on a channel according to an embodiment of the present disclosure.

FIG. 18 is a flowchart of a method for performing measurement and reporting on a channel according to an embodiment of the present disclosure.

Referring to FIG. 18, the UE may perform channel measurement (S1810).

Here, the measurement of a channel may refer to, for example, measurement of a CSI-RS or the like based on information indicated by the network to the BS. Details thereof will be described later.

In addition, measurement of a channel may refer to, for example, measurement of a DMRS. Details thereof will be described later.

The UE may transmit information based on the measurement to the network (S1820).

Here, specific contents of the information transmitted by the UE (e.g., information based on the measurement) will be described later.

Each step in FIG. 18 may be performed by a processor of the UE.

Specifically, each step may be performed by the processor of the UE to be described later. In addition, a physical signal of each step may be transmitted/received by the transceiver of the UE under the control of the processor. Control information, data, etc. transmitted through a PDCCH and a PDSCH may be processed by the processor of the UE.

For transmission/reception of physical layer signals, the processor may include the same configuration as a device to be described later.

1. Measurement RS for Control Channel Measurement

As a reference signal for performing measurement, the following signals may be considered.

All or some of the signals proposed below may be used for control channel measurement.

In addition, the following options may be performed for each CORESET and/or SS set.

Results measured in the manner proposed below may be reported to the network by periodic and/or (triggering-based) aperiodic reporting.

The present disclosure will be described based on CORESET, but the present disclosure may also operate based on a search space set. In addition, when CORESET-based reporting is performed, the present disclosure may be applied to all search space sets linked to the corresponding CORESET or may be applied only to a specific SS set (e.g., USS).

Option 1) CSI-RS (or TRS, SSB) Spatially QCLed with a CORESET

In the NR, a TCI state is introduced to define a spatial QCL between a network and a UE, and each TCI state may be expressed in the form of a CSI-RS, TRS, SSB index, or the like. In the control channel, the TCI state may be defined for each CORESET, which means that CSI-RS (or TRS, SSB index) or the like in spatial QCL relationship for each CORESET is linked.

Therefore, when the network indicates a transmission time and transmission resource of the CSI-RS linked with a specific CORESET to the UE, the UE may perform measurement (e.g., SINR) on the corresponding CSI-RS and infer channel quality for a resource (e.g., CORESET) in a spatial QCL relationship with the corresponding CSI-RS based on the measurement.

The derived channel quality may be reported to the network in a form suitable for the control channel (e.g., preferred AL(s)), and based on this, the network may transmit a control channel more suitable for the UE (e.g., lower AL).

In addition, the UE may derive a precoding matrix indicator (PMI) of the corresponding CORESET through measurement of the TCI for each CORESET and report the derived PMI to the network. This may be applied by limiting to CORESET in which interleaving is not used. The network receiving the PMI may perform control channel transmission using beamforming.

Here, the option 1 may have an advantage in that measurement opportunities and methods of utilizing measurement results are wide.

Option 2) Control Channel DMRS

As another method, measurement (e.g., SINR) may be performed using a DMRS of a control channel.

In the case of the control channel, there may be a case in which the UE misses a DCI transmitted by the network, which is transmitted by the network. In this case, if the UE fails to decode, the corresponding UE may not determine whether the decoding failure was caused as the network did not transmit the DCI or whether decoding failed due to a channel environment or the like although the network transmitted the DCI.

Therefore, when the channel quality of the control channel is measured using the DMRS, there is an advantage that the measurement may be performed only on the successfully decoded DCI.

For the same reason, the measurement using the DMRS is preferably used to determine whether am AL of the DCI is excessive, which may be desirable from the viewpoint of power saving.

That is, the UE may report whether the current AL is suitable or whether an AL lower than the current AL may be used based on the measurement result. Alternatively, it may be reported in the form of a preferred AL(s) based on the measurement result.

As proposed above, when the control channel decoding succeeds in a specific CORESET, the UE may not perform blind decoding on an AL larger than a previously successfully decoded AL in the blind decoding for the corresponding CORESET (after a specific time).

However, when option 2 is additionally used, if it is determined that a coding rate of the successfully decoded AL is too low, blind decoding for the AL may not be performed, so it may operate efficiently from the viewpoint of power saving.

2. Measurement Report for Control Channel

As mentioned above, the channel quality for the control channel may be reported periodically and/or aperiodically.

In the case of periodic reporting, the network may allocate a reporting resource/period for each CORESET to the UE or report the channel quality for all configured CORESETs through one resource/period together. Here, since each CORESET may have different characteristics such as interleaving status, REG bundle size, and RS type (wideband/narrowband), an appropriate AL (coding rate) may be different even at the same SINR. Therefore, it may be desirable to perform measurement and reporting by CORESET.

Aperiodic reporting may be triggered by the necessity of the network or a request of the UE. For example, if the network transmits the DCI in a specific CORESET but an ACL/NACK of the PDSCH linked to the corresponding DCI is not transmitted from the UE for a certain number of times or for a certain time, the network may instruct the UE to report the channel quality of the corresponding CORESET.

The UE may report the channel quality of the control channel using the following metric. The following methods may be implemented alone or in combination.

The present disclosure is described based on CORESET, but the present disclosure may also operate based on a search space set.

In addition, when CORESET-based reporting is performed, the present disclosure may be applied to all search space sets linked with the corresponding CORESET or may be applied only to a specific SS set (e.g., USS).

Option 1) Preferred (or Recommended) AL(s)

The UE may report AL(s) that the UE may stably receive at the corresponding CORESET based on the measurement result.

For example, when the UE measures an SINR or the like based on the DMRS, the UE may determine a reported value according to the linkage between the self-derived SINR and AL.

In addition, when a certain time elapses after the report or when a network confirm message for the report is received, the UE may skip blind decoding on a candidate allocated to an AL smaller than the reported AL(s).

For example, the UE may report one of values among {0, 1, 4, 8}, and here, "0" means that DCI reception is difficult in the corresponding CORESET or that DCI reception is possible only by the largest AL.

After "N" slot(s) from a time of reporting, monitoring for an AL smaller than the reported value may not be performed.

Option 2) Preferred (or Recommended) Coding Rate

In the case of monitoring DCIs having different sizes are monitored in a specific SS set or in the case of monitoring DCIs having different sizes in a plurality of SS sets linked to a specific CORESET, it may not be desirable to report an aggregation level (AL) because the coding rate is set to be different for each DCI size.

To solve this problem, a coding rate suitable for the channel quality of the corresponding CORESET may be reported, or a reference DCI size may be determined.

Here, the reference DCI size refers to a method of defining a specific DCI size as a reference and reporting a preferred AL derived based on the DCI size.

The UE may report a coding rate that may be stably received in the corresponding CORESET based on the measurement in a specific CORESET, and the network may select an AL suitable for the DCI size to be transmitted based on the received coding rate.

The UE may perform monitoring for an AL closest to the corresponding coding rate and an AL larger than the corresponding AL in the DCI size monitored based on the reported coding rate.

Figure 19:
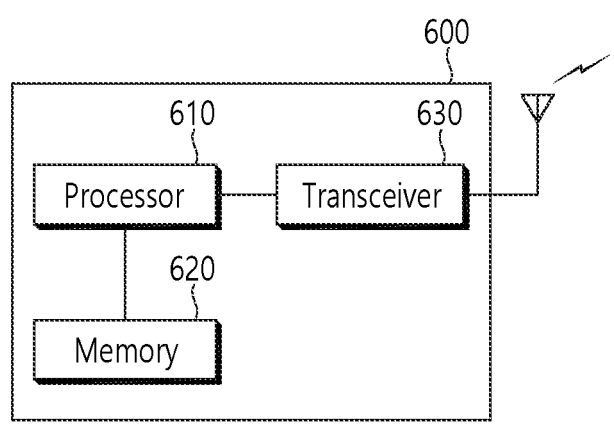
FIG. 19 shows a UE implementing an embodiment of the present disclosure.

FIG. 19 shows a UE implementing an embodiment of the present disclosure. The document described above for the UE side may be applied to this embodiment.

A UE 600 includes a processor 610, a memory 620, and a transceiver 630. The processor 610 may be configured to implement the proposed functions, procedures, and/or methods described herein. Layers of an air interface protocol may be implemented in the processor 610.

More specifically, the processor 610 may include the information receiving unit 1510 and the monitoring performing unit 1520 described above.

The information receiving unit 1510 may be configured to receive information related to monitoring from a network (e.g., a BS). Here, for example, the information related to monitoring may refer to information related to reducing the range of a target to be monitored by the UE.

Here, since details of the UE receiving information related to monitoring from the network (e.g., the BS) is the same as described above, a redundant description of the duplicated contents will be omitted for convenience of description.

The monitoring performing unit 1520 may be configured to perform monitoring based on the information related to monitoring.

Here, since details of the UE performing monitoring based on the information related to monitoring is the same as described above, a redundant description of duplicated contents will be omitted for convenience of description.

The memory 620 is operatively coupled to the processor 610 and stores various information for operating the processor 610. The transceiver 630 is operatively coupled to the processor 610 and transmits and/or receives a wireless signal.

The processor 610 may include an application-specific integrated circuit (ASIC), another chipset, a logic circuit, and/or a data processing device. The memory 620 may include a read-only memory (ROM), a random access memory (RAM), a flash memory, a memory card, a storage medium, and/or other storage device. The transceiver 630 may include a baseband circuit for processing a radio frequency (RF) signal. When an embodiment is implemented as software, the technologies described in this disclosure may be implemented as a module (e.g., a procedure, a function, etc.) that performs the functions described in this disclosure. Modules may be stored in the memory 620 and executed by the processor 610. The memory 620 may be implemented inside the processor 610. Alternatively, the memory 620 may be implemented outside the processor 610 and may be communicatively connected to the processor 610 through various means known in the art.

Figure 20:
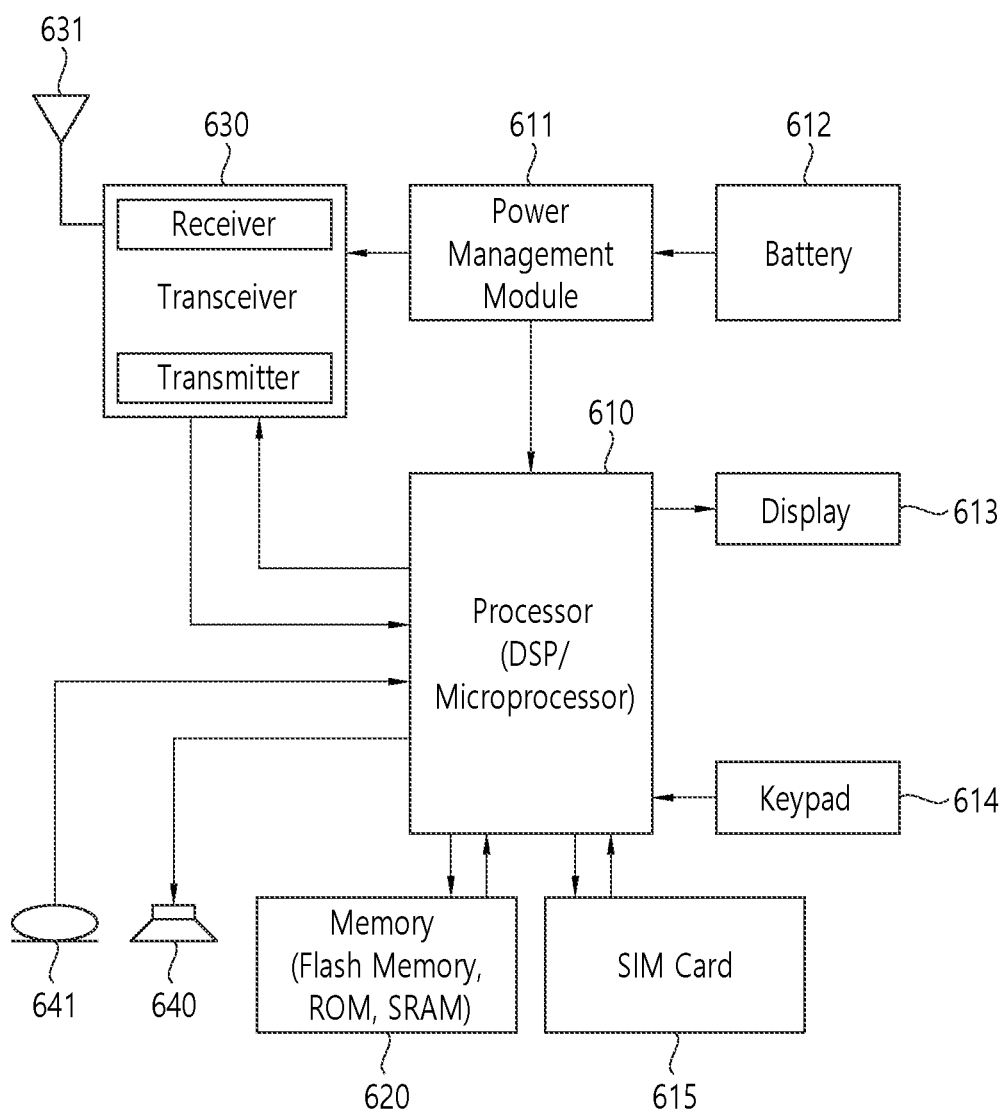
FIG. 20 shows a specific UE implementing an embodiment of the present disclosure.

FIG. 20 shows a specific UE implementing an embodiment of the present disclosure.

The present disclosure described above for the UE side may be applied to this embodiment.

The UE includes a processor 610, a power management module 611, a battery 612, a display 613, a keypad 614, a subscriber identification module (SIM) card 615, a memory 620, a transceiver 630, at least one antennas 631, a speaker 640, and a microphone 641.

The processor 610 may be configured to implement the proposed functions, procedures, and/or methods described herein. Layers of an air interface protocol may be implemented in the processor 610. The processor 610 may include an application-specific integrated circuit (ASIC), another chipset, a logic circuit, and/or a data processing device. The processor may be an application processor (AP). The processor 610 may include at least one of a digital signal processor (DSP), a central processing unit (CPU), a graphics processing unit (GPU), and a modem (modulator and demodulator). Examples of the processor 610 may be SNAPDRAGON™ series processors manufactured by Qualcomm®, EXYNOS™ series processors manufactured by Samsung®, A series processors manufactured by Apple®, HELIO™ series processors manufactured by MediaTek®, ATOM™ series processors manufactured by INTEL®, or corresponding next-generation processors.

More specifically, the processor 610 may include the information receiving unit 1510 and the monitoring performing unit 1520 described above.

The information receiving unit 1510 may be configured to receive information related to monitoring from a network (e.g., a BS). Here, for example, the information related to monitoring may refer to information related to reducing the range of a target to be monitored by the UE.

Here, since details of the UE receiving the information related to monitoring from the network (e.g., the BS) is the same as described above, a redundant description of the duplicated contents will be omitted for convenience of description.

The monitoring performing unit 1520 may be configured to perform monitoring based on the information related to monitoring.

Here, since details of the UE performing monitoring based on the information related to monitoring is the same as described above, a redundant description of duplicated contents will be omitted for convenience of description.

The power management module 611 manages power for the processor 610 and/or the transceiver 630. The battery 612 supplies power to the power management module 611. The display 613 outputs a result processed by the processor 610. The keypad 614 receives an input to be used by the processor 610. The keypad 614 may be displayed on the display 613. The SIM card 615 is an integrated circuit used to securely store an IMSI (international mobile subscriber identity) used to store an international mobile subscriber identity (IMSI) used for identifying and authenticating a subscriber in a mobile phone device such as a mobile phone and a computer and a key linked therewith. Contact information may be stored on many SIM cards.

The memory 620 is operatively coupled to the processor 610 and stores various information for operating the processor 610. The memory 620 may include a ROM, a RAM, a flash memory, a memory card, a storage medium, and/or other storage device. When an embodiment is implemented as software, the technologies described in this disclosure may be implemented as a module (e.g., a procedure, a function, etc.) that performs the functions described in this disclosure. Modules may be stored in the memory 620 and executed by the processor 610. The memory 620 may be implemented inside the processor 610. Alternatively, the memory 620 may be implemented outside the processor 610 and may be communicatively connected to the processor 610 through various means known in the art.

The transceiver 630 is operatively coupled with the processor 610 and transmits and/or receives a wireless signal. The transceiver 630 includes a transmitter and a receiver. The transceiver 630 may include a baseband circuit for processing an RF signal. The transceiver unit controls the at least one antenna 631 to transmit and/or receive wireless signals.

The speaker 640 outputs a sound-related result processed by the processor 610. The microphone 641 receives a sound-related input to be used by the processor 610.

Figure 21:
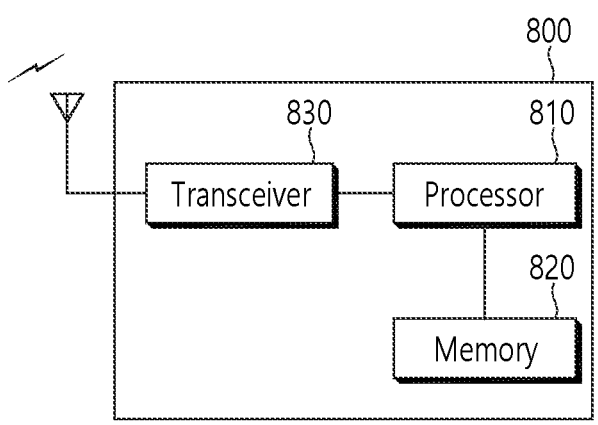
FIG. 21 shows a network node implementing an embodiment of the present disclosure.

FIG. 21 shows a network node implementing an embodiment of the present disclosure.

The present disclosure described above for the network side may be applied to this embodiment.

The network node 800 includes a processor 810, a memory 820, and a transceiver 830. The processor 810 may be configured to implement the proposed functions, procedures and/or methods described herein. Layers of an air interface protocol may be implemented in the processor 810.

More specifically, the processor 810 may include an information transmitting unit 1710.

The information transmitting unit 1710 may be configured to transmit information related to monitoring to the UE. Here, for example, the information related to monitoring may refer to information related to reducing the range of a target to be monitored by the UE.

Here, since details of the BS transmitting information related to monitoring to the UE is the same as described above, a redundant description of the duplicated contents will be omitted for convenience of description.

The memory 820 is operatively coupled to the processor 810 and stores various information for operating the processor 810. The transceiver 830 is operatively coupled to the processor 810 and transmits and/or receives a wireless signal.

The processor 810 may include an application-specific integrated circuit (ASIC), another chipset, a logic circuit, and/or a data processing device. The memory 820 may include a read-only memory (ROM), a random access memory (RAM), a flash memory, a memory card, a storage medium, and/or other storage device. The transceiver 830 may include a baseband circuit for processing a radio frequency (RF) signal. When an embodiment is implemented as software, the technologies described in this disclosure may be implemented as a module (e.g., a procedure, a function, etc.) that performs the functions described in this disclosure. Modules may be stored in the memory 820 and executed by the processor 810. The memory 820 may be implemented inside the processor 810. Alternatively, the memory 820 may be implemented outside the processor 810 and may be communicatively connected to the processor 810 through various means known in the art.

Figure 22:
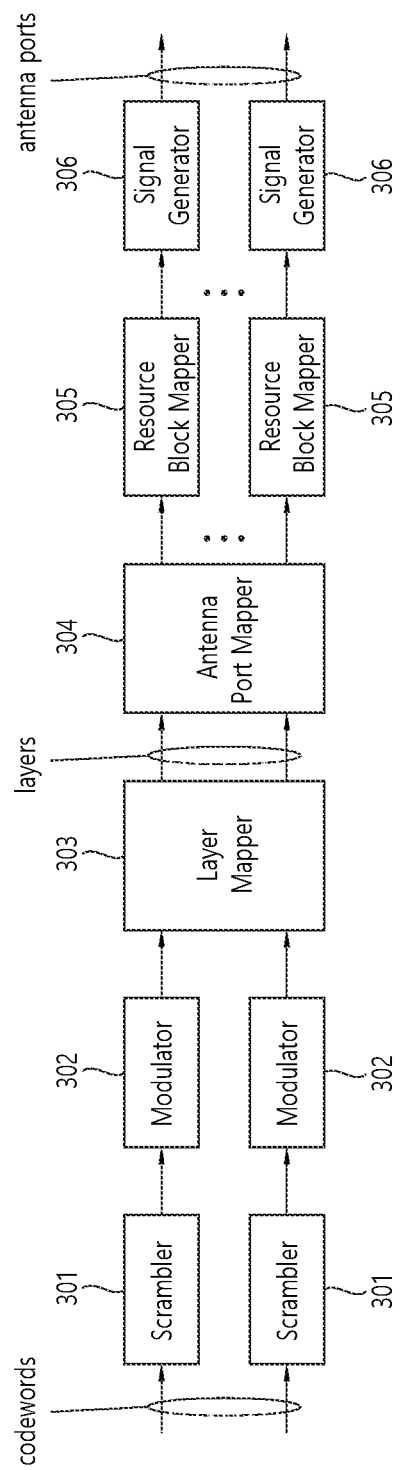
FIG. 22 shows an example of a structure of a signal processing module in a transmitting device.

FIG. 22 shows an example of a structure of a signal processing module in a transmitting device. Here, signal processing may be performed by a processor of a BS/UE such as the processor of FIGS. 19 to 21.

Referring to FIG. 22, a transmitting device 1810 in a UE or BS may include a scrambler 301, a modulator 302, a layer mapper 303, an antenna port mapper 304, a resource block mapper 305, and a signal generator 306.

The transmitting device 1810 may transmit one or more codewords. Coded bits in each codeword are each scrambled by the scrambler 301 and transmitted on a physical channel. The codeword may be referred to as a data string and may be equivalent to a transport block, which is a data block provided by a MAC layer.

The scrambled bits are modulated by the modulator 302 into complex-valued modulation symbols. The modulator 302 may modulate the scrambled bits according to a modulation scheme and may arrange the same as complex-valued modulation symbols representing a position on a signal constellation. There is no limitation in the modulation scheme, and m-phase shift keying (m-PSK) or m-quadrature amplitude modulation (m-QAM) may be used for modulation of the encoded data. The modulator may be referred to as a modulation mapper.

The complex-valued modulation symbols may be mapped to one or more transport layers by the layer mapper 303. The complex-valued modulation symbols on each layer may be mapped by the antenna port mapper 304 for transmission on the antenna port.

The resource block mapper 305 may map the complex-valued modulation symbols for each antenna port to appropriate resource elements in a virtual resource block allocated for transmission. The resource block mapper 305 may map the virtual resource block to a physical resource block according to an appropriate mapping scheme. The resource block mapper 305 may allocate the complex-valued modulation symbols for each antenna port to an appropriate subcarrier and multiplexes the same according to a user.

The signal generator 306 may modulate the complex-valued modulation symbols for each antenna port, i.e., antenna specific symbols, using a specific modulation scheme, e.g., an orthogonal frequency division multiplexing (OFDM) scheme to generate a complex-valued time domain OFDM symbol signal. The signal generator may perform inverse fast Fourier transform (IFFT) on the antenna specific symbols, and a cyclic prefix (CP) may be inserted into time domain symbols on which IFFT has been performed. The OFDM symbols are transmitted to a receiving device through each transmission antenna through digital-to-analog conversion and frequency up-conversion. The signal generator may include an IFFT module, a CP inserter, a digital-to-analog converter (DAC), a frequency uplink converter, and the like.

Figure 23:
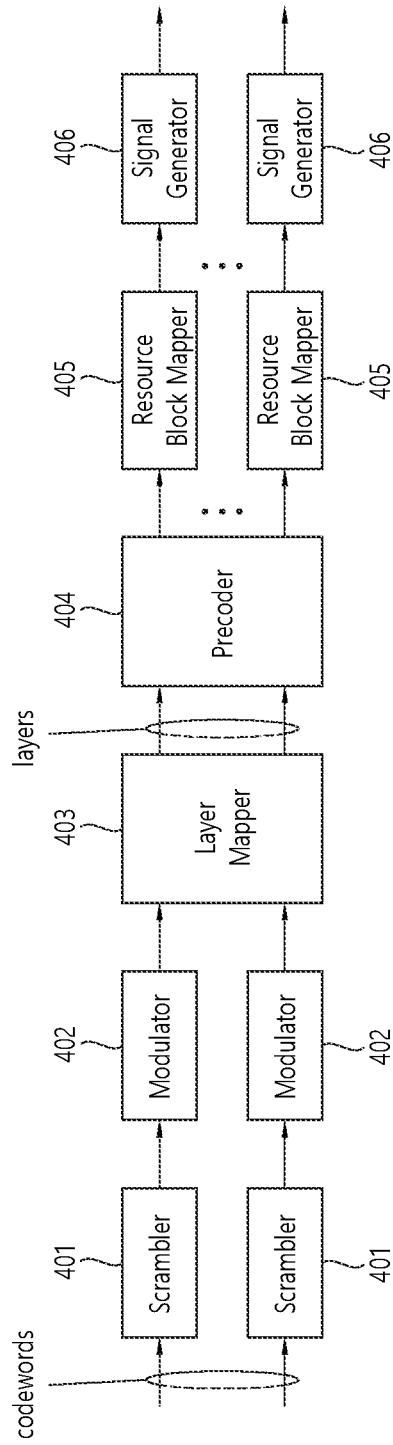
FIG. 23 shows another example of a structure of a signal processing module in the transmitting device.

FIG. 23 shows another example of a structure of a signal processing module in the transmitting device. Here, signal processing may be performed by the processor of the UE/BS of FIGS. 19 to 22.

Referring to FIG. 23, the transmitting device 1810 of the UE or BS may include a scrambler 401, a modulator 402, a layer mapper 403, a precoder 404, a resource block mapper 405, and a signal generator 406.

The transmitting device 1810 may scramble coded bits in one codeword by the scrambler 401 and then transmit the scrambled bits through a physical channel.

The scrambled bits are modulated into complex-valued modulation symbols by the modulator 402. The modulator may modulate the scrambled bits according to a predetermined modulation scheme and arrange the modulated bits as complex-valued modulation symbols representing a position on a signal constellation. There is no limitation in the modulation scheme, and pi/2-binary phase shift keying (pi/2-BPSK), m-phase shift keying (m-PSK), m-quadrature amplitude modulation (m-QAM), and the like be used for modulation of the coded data.

The complex-valued modulation symbols may be mapped to one or more transport layers by the layer mapper 403.

The complex-valued modulation symbols on each layer may be precoded by the precoder 404 for transmission on the antenna port. Here, the precoder may perform precoding after performing transform precoding on the complex-valued modulation symbols. Alternatively, the precoder may perform precoding without performing transform precoding. The precoder 404 may process the complex-valued modulation symbols in a MIMO manner according to multiple transmit antennas, output antenna specific symbols, and distribute the antenna specific symbols to the corresponding resource block mapper 405. An output z of the precoder 404 may be obtained by multiplying an output y of the layer mapper 403 by an N×M precoding matrix W. Here, N is the number of antenna ports, and M is the number of layers.

The resource block mapper 405 maps the complex-valued modulation symbols for each antenna port to appropriate resource elements in a virtual resource block allocated for transmission.

The resource block mapper 405 may allocate the complex-valued modulation symbols to an appropriate subcarrier and multiplex the same according to a user.

The signal generator 406 may modulate the complex-valued modulation symbols according to a specific modulation scheme, e.g., an OFDM scheme to generate a complex-valued time domain OFDM symbol signal. The signal generator 406 may perform inverse fast Fourier transform (IFFT) on the antenna specific symbols, and a cyclic prefix (CP) may be inserted into time domain symbols on which IFFT has been performed. The OFDM symbols are transmitted to a receiving device through each transmission antenna through digital-to-analog conversion and frequency up-conversion. The signal generator 406 may include an IFFT module, a CP inserter, a digital-to-analog converter (DAC), a frequency uplink converter, and the like.

A signal processing process of a receiving device 1820 may be configured as the reverse of the signal processing process of the transmitting device. Specifically, a processor 1821 of the receiving device 1820 performs decoding and demodulation on a wireless signal received through antenna port(s) of a transceiver 1822 from the outside. The receiving device 1820 may include a plurality of multiple reception antennas, and each signal received through the reception antenna is restored to a baseband signal and then restored to a data string that the transmitting device 1810 was originally intended to transmit through multiplexing and MIMO demodulation. The receiving device 1820 may include a signal restorer for restoring a received signal into a baseband signal, a multiplexer for combining and multiplexing the received signal, and a channel demodulator for demodulating a multiplexed signal stream into a corresponding codeword. The signal restorer, the multiplexer, and the channel demodulator may be configured as one integrated module or each independent module performing functions thereof. More specifically, the signal restorer may include an analog-to-digital converter (ADC) that converts an analog signal into a digital signal, a CP remover that removes a CP from the digital signal, a fast Fourier transform (FFT) module that outputs a frequency domain symbol by applying FFT to the CP-removed signal, and a resource element demapper/equalizer that restores the frequency domain symbol into an antenna-specific symbol. The antenna-specific symbol is restored to a transport layer by a multiplexer, and the transport layer is restored to a codeword that the transmitting device intended to transmit by a channel demodulator.

The embodiments of the present disclosure described above may be applied even in the following situations.

Figure 24:
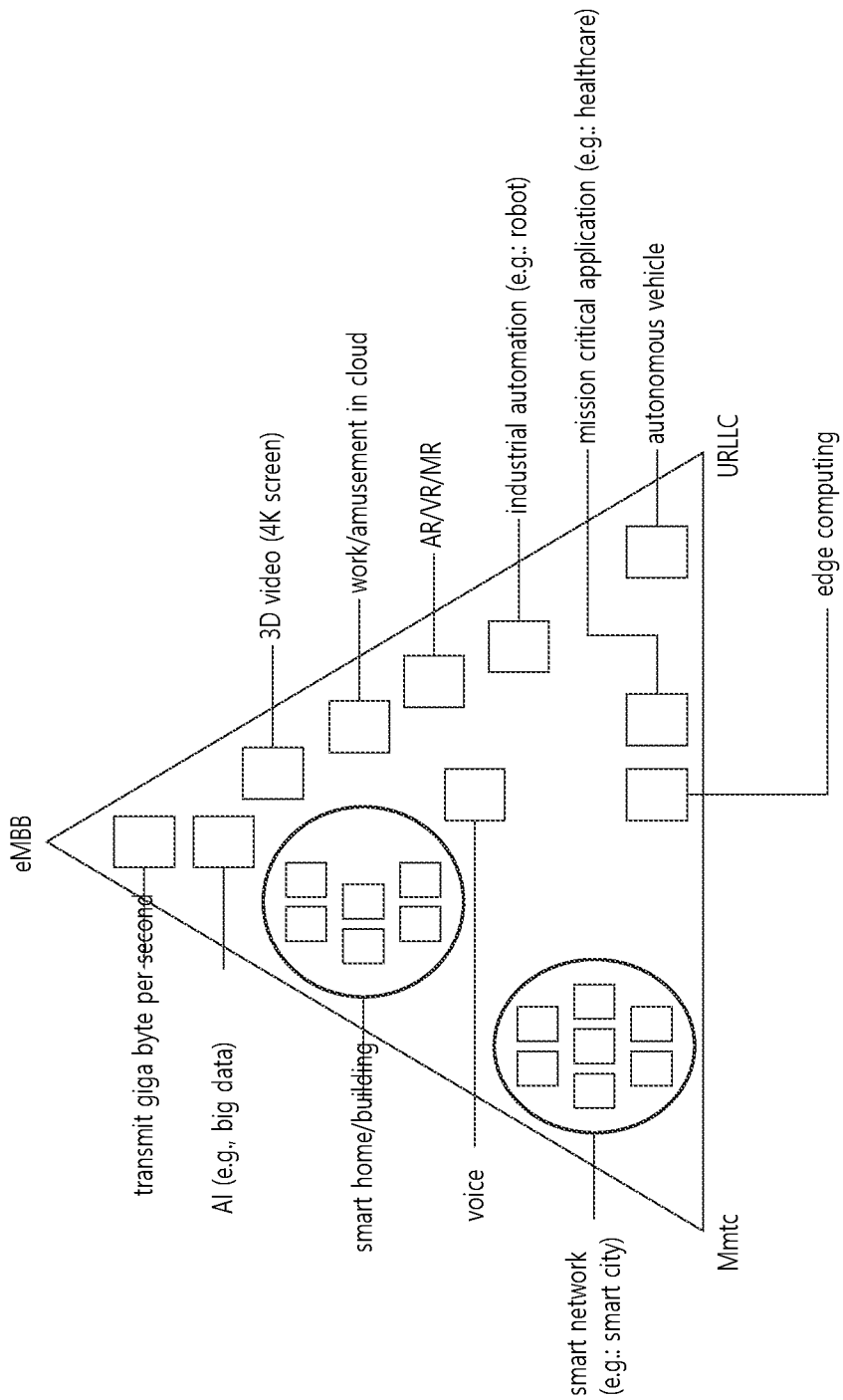
FIG. 24 shows an example of a 5G usage scenario to which the technical features of the present disclosure may be applied.

FIG. 24 shows an example of a 5G usage scenario to which the technical features of the present disclosure may be applied.

The 5G usage scenario shown in FIG. 24 is merely exemplary, and the technical features of the present disclosure may also be applied to other 5G usage scenarios not shown in FIG. 24.

Referring to FIG. 24, three main requirements areas of 5G include (1) an enhanced mobile broadband (eMBB) area, (2) a massive machine type communication (mMTC) area, and (3) ultra-reliable and low latency communications (URLLC) area. Some use cases may require multiple areas for optimization and other use cases may focus on only one key performance indicator (KPI). 5G supports these various use cases in a flexible and reliable way.

The eMBB focuses on an overall improvement of a data rate, latency, user density, capacity and coverage of mobile broadband access. The eMBB targets a throughput of about 10 Gbps. The eMBB goes far beyond basic mobile Internet access and covers rich interactive work and media and entertainment applications in a cloud or augmented reality. Data is one of the key drivers of 5G, and it may not be possible to see dedicated voice services for the first time in the 5G era. In 5G, voice is expected to be processed as an application program simply using data connection provided by a communication system. A main reason for an increased traffic volume is an increase in content size and an increase in the number of applications requiring high data rates. Streaming services (audio and video), interactive video and mobile Internet connections may become more prevalent as more devices are connected to the Internet. Many of these applications require always-on connectivity to push real-time information and notifications to users. Cloud storage and applications are rapidly increasing in mobile communication platforms, which may be applied to both work and entertainment. The cloud storage is a special use case that drives the growth of uplink data rates. 5G is also used in remote work in the cloud and requires much lower end-to-end latency to maintain a good user experience when tactile interfaces are used. In entertainment, for example, cloud gaming and video streaming are another key factor to increase demand for mobile broadband capabilities. Entertainment is essential on smartphones and tablets anywhere by including highly mobile environments such as trains, cars, and airplanes. Another use case is augmented reality and information retrieval for entertainment. Here, augmented reality requires very low latency and an instantaneous amount of data.

The mMTC is designed to enable communication between a large number of low-cost devices powered by batteries and is intended to support applications such as smart weighing, logistics, field and body sensors. The mMTC targets 10 years of batteries and/or 1 million units per $km^2$. The mMTC enables seamless connection of embedded sensors in all fields and is one of the most anticipated 5G use cases. Potentially, IoT devices are predicted to reach 20.4 billion by 2020. Industrial IoT is one of the areas where 5G plays a major role in enabling smart cities, asset tracking, smart utilities, agriculture, and security infrastructure.

The URLLC, which allows devices and machines to communicate with high reliability, very low latency, and high availability, is ideal for vehicle communication, industrial control, factory automation, teleoperation, smart grid and public safety applications. The URLLC aims for delay of about 1 ms. The URLLC includes new services that will transform the industry through ultra-reliable/low-latency links such as remote control of major infrastructure and autonomous vehicles. The level of reliability and delay is essential for smart grid control, industrial automation, robotics, drone control and coordination.

Next, a number of examples of use included in a triangle of FIG. 24 will be described in detail.

5G may complement fiber-to-the-home (FTTH) and cable-based broadband (or DOCSIS) by providing streams rated from hundreds of megabits per second to gigabits per second. Such a high speed may be required to deliver TVs with resolutions of 4K or higher (6K, 8K and higher) as well as virtual reality (VR) and augmented reality (AR). VR and AR applications include almost immersive sports events. Certain applications may require special network configuration. For example, in the case of VR games, a game company may need to integrate a core server with an edge network server of a network operator to minimize latency.

Automotive is expected to be an important new driving force in 5G together with many use cases for mobile communication for vehicles. For example, entertainment for passengers requires both high capacity and high mobile broadband. The reason is because future users will continue to expect high-quality connections, regardless of location and speed. Another use case in the automotive sector is an augmented reality (AR) dashboard. A driver may identify an object in the dark in addition to seeing through a front window through the AR dashboard. The AR dashboard displays information in an overlapping manner to inform the driver about a distance and movement of objects. In the future, wireless modules will enable communication between vehicles, exchange of information between a vehicle and a supporting infrastructure, and exchange of information between a vehicle and other connected devices (e.g., devices carried by pedestrians). A safety system may lower the risk of accidents by guiding a driver to alternative courses of action to make driving safer. A next step will be a remotely controlled vehicle or an autonomous vehicle. This requires very reliable and very fast communication between different autonomous vehicles and/or between vehicles and infrastructure. In the future, autonomous vehicles will perform all driving activities and drivers will focus only on traffic anomalies that the vehicle itself cannot identify. The technical requirements of autonomous vehicles require ultra-low latency and ultra-fast reliability to increase traffic safety to levels that cannot be achieved by humans.

Smart cities and smart homes referred to as smart society will be embedded with high-density wireless sensor networks. A distributed network of intelligent sensors will identify cost for cities and houses and conditions for energy efficient maintenance. A similar setup may be performed for each household. Temperature sensors, window and heating controllers, burglar alarms, and home appliances are wirelessly connected. Many of these sensors typically require low data rates, low power, and low cost. However, for example, real-time HD video may be required in certain types of devices for surveillance.

The consumption and distribution of energy including heat or gas is highly decentralized, requiring automated control of distributed sensor networks. The smart grids interconnect these sensors using digital information and communication technologies to collect information and act accordingly. This information may include behaviors of suppliers and consumers, and thus, the smart grids may improve efficiency, reliability, economical efficiency, sustainability of production, and distribution of fuels such as electricity in an automated manner. The smart grids may also be viewed as another low-latency sensor network.

A health sector has many applications that may benefit from mobile communications. The communication system may support remote medical services providing clinical care from remote locations. This may help reduce barriers to distance and improve access to medical services that are not consistently available in remote rural areas. It is also used to save lives in critical treatment and emergencies. A wireless sensor network based on mobile communication may provide remote monitoring and sensors for parameters such as heart rate and blood pressure.

Wireless and mobile communications are becoming increasingly important in industrial applications. Wiring is expensive to install and maintain. Thus, a possibility of replacing cables with reconfigurable wireless links is an attractive opportunity in many industries. However, achieving this requires that the wireless connection should operate with a delay, reliability and capacity similar to those of the cables and its management should be simplified. Low latency and very low error probability are new requirements that need to be connected to 5G.

Logistics and cargo tracking is an important use case for mobile communications that enables tracking of inventory and packages anywhere using location-based information systems. Use cases of logistics and freight tracking typically require low data rates but require a wide range and reliable location information.

Meanwhile, the devices described above may be a BS, a network node, a transmitting UE, a receiving UE, a wireless device, a wireless communication device, a vehicle, a vehicle equipped with an autonomous driving function, a connected car, and a drone (unmanned aerial vehicle (UAV)), an artificial intelligence (AI) module, a robot, an AR device, a VR device, a mixed reality (MR) device, a hologram device, a public safety device, an MTC device, an IoT device, a medical device, a fintech device (or financial device), a security device, a climate/environment device, a device related to 5G services, or other devices related to the 4th industrial revolution field.

For example, the UE may include a mobile phone, a smartphone, a laptop computer, a digital broadcasting terminal, a personal digital assistant (PDA), a portable multimedia player (PMP), a navigation system, a slate PC, a tablet PC, ultrabook, a wearable device (e.g., smartwatch, smart glass, head mounted display (HMD), etc). For example, the HMD may be a display device worn on the head. For example, the HMD may be used to implement VR, AR, or MR.

For example, a drone may be a vehicle that flies based on a wireless control signal, without a human therein. For example, the VR device may include a device that implements an object or a background of a virtual world. For example, the AR device may include a device that implements by connecting an object or background of a virtual world to an object or background of the real world. For example, the MR device may include a device that implements by combining an object or background of a virtual world to an object or background of the real world. For example, the hologram device may include a device that implements a 360-degree stereoscopic image by recording and reproducing stereoscopic information by utilizing an interference phenomenon of light generated when two laser lights meet, called holography. For example, the public safety device may include an image relay device or an image device wearable on a user's body. For example, the MTC device and the IoT device may be devices that do not require direct human intervention or operation. For example, the MTC device and the IoT device may include a smart meter, a bending machine, a thermometer, a smart light bulb, a door lock, or various sensors. For example, the medical device may be a device used for the purpose of diagnosing, treating, alleviating, or preventing a disease. For example, the medical device may be a device used for the purpose of diagnosing, treating, alleviating or correcting an injury or disorder. For example, the medical device may be a device used for the purpose of examining, replacing or modifying a structure or function. For example, the medical device may be a device used for the purpose of controlling pregnancy. For example, the medical device may include a device for treatment, a device for surgery, a device for (extra-corporeal) diagnosis, a device for hearing aids, or a device for a surgical procedure. For example, the security device may be a device installed to prevent a risk that may occur and maintain safety. For example, the security device may be a camera, a CCTV, a recorder, or a black box. For example, the fintech device may be a device capable of providing financial services such as mobile payment. For example, the fintech device may include a payment device or a point of sales (POS). For example, the climate/environment device may include a device that monitors or predicts a climate/environment.

The embodiments of the present disclosure described above may also be applied to the following technology.

<Artificial Intelligence (AI)>

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

<Robot>

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields.

A robot may include an actuator or a driver including a motor to perform various physical operations, such as moving a robot joint. In addition, a movable robot may include a wheel, a brake, a propeller, and the like in a driver to run on the ground or fly in the air through the driver.

<Self-Driving, Autonomous Driving>

Autonomous driving refers to a self-driving technology, and autonomous vehicle refers to a vehicle that is driven without a user's operation or with the user's minimal operation.

For example, autonomous driving may include all of a technology that maintains a driving lane, a technology that automatically adjusts a speed such as adaptive cruise control, a technology that automatically drives along a specified route, a technology that drives by automatically setting a route when a destination is set, and the like.

The vehicle may include all of a vehicle including only an internal combustion engine, a hybrid vehicle including both an internal combustion engine and an electric motor, and an electric vehicle including only an electric motor, and may include not only automobiles but also trains and motorcycles.

Here, the autonomous vehicle may be considered as a robot with an autonomous driving function.

<eXtended Reality (XR)>

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

Finally, the claims set forth herein may be combined in a variety of ways. For example, the technical features of the method claims of the present disclosure may be combined to be implemented as a device, the technical features of the device claims of the present disclosure may be combined to be implemented as a method. In addition, the technical features of the method claims of the present disclosure and the technical features of the device claims may be combined to be implemented as a device, and the technical features of the method claims of the present disclosure and the technical features of the device claims may be combined to be implemented as a method.

What is claimed is:

1. A method for receiving configuration information in a wireless communication system, the method performed by a user equipment (UE) and comprising:

receiving, from a base station, the configuration information related to a control resource set (CORESET), wherein the CORESET has a time duration of 1 to 3 orthogonal frequency division multiplexing (OFDM) symbols, wherein at least one control channel element (CCE) is defined within the CORESET, wherein the at least one CCE includes a plurality of resource element groups (REGs), monitoring a physical downlink control channel (PDCCH) in the CORESET, wherein the configuration information related to the CORESET includes a transmission configuration indicator (TCI) state related to the CORESET, wherein the UE receives monitoring information related to reducing a range of a target to be monitored based on the configuration information, and wherein, based on the TCI state having an unavailable value, the UE does not monitor on the CORESET related to the TCI state.

2. The method of claim 1, wherein the UE receives information on monitoring candidates from the based station and monitors on some of the monitoring candidates based on the monitoring information.

3. The method of claim 1, wherein the monitoring information is transmitted based on downlink control information (DCI) or a physical downlink shared channel (PDSCH).

4. The method of claim 3, wherein the CORESET, a search space (SS) set, an aggregation level (AL), or all or some of candidates to be monitored are informed based on the base station after the UE receives the DCI.

5. The method of claim 4, wherein the CORESET is configured in the UE based on explicit signaling of the base station or implicit decision of the UE, and the UE turns on or off monitoring on the CORESET based on the monitoring information.

6. The method of claim 5, wherein the UE monitors on the CORESET based on the monitoring information informing ON of the CORESET, and the UE skips monitoring on the CORESET based on the monitoring information informing OFF of the CORESET.

7. The method of claim 4, wherein at least one SS set is configured in the UE based on explicit signaling of the base station or implicit decision of the UE, and the UE turns on or off monitoring on the at least one SS set based on the monitoring information.

8. The method of claim 1, wherein the UE reports a capability for operating in a power saving mode to the base station.

9. The method of claim 8, wherein an application time point of the power saving mode or a configuration for the power saving for the UE is informed based on the base station through higher layer signaling.

10. The method of claim 1, wherein the UE implements an advanced driver assistance system (ADAS) function based on a signal for controlling movement of a device, the UE switches a driving mode of the device from an autonomous driving mode to a manual driving mode or from the manual driving mode to the autonomous driving mode upon receiving a user input, and/or the UE performs autonomous driving based on external object information, wherein the external object information includes at least one of information on the presence or absence of an object; location information of the object, distance information between the device and the object, and relative speed information between the device and the object.

11. A user equipment (UE) comprising:
a memory;
a transceiver; and
a processor operably coupled to the memory and the transceiver, wherein the processor is configured to perform operations comprising:
controlling the transceiver to receive, from a base station, configuration information related to a control resource set (CORESET),
wherein the CORESET has a time duration of 1 to 3 orthogonal frequency division multiplexing (OFDM) symbols,
wherein at least one control channel element (CCE) is defined within the CORESET,
wherein the at least one CCE includes a plurality of resource element groups (REGs),
monitoring a physical downlink control channel (PDCCH) in the CORESET,
wherein the configuration information related to the CORESET includes a transmission configuration indicator (TCI) state related to the CORESET,
wherein the UE receives monitoring information related to reducing a range of a target to be monitored based on the configuration information, and
wherein, based on the TCI state having an unavailable value, the UE does not monitor on the CORESET related to the TCI state.

12. A processor configured to control a user equipment (UE) to perform operations comprising:
controlling a transceiver to receive, from a base station, configuration information related to a control resource set (CORESET),
wherein the CORESET has a time duration of 1 to 3 orthogonal frequency division multiplexing (OFDM) symbols,
wherein at least one control channel element (CCE) is defined within the CORESET,
wherein the at least one CCE includes a plurality of resource element groups (REGs),
monitoring a physical downlink control channel (PDCCH) in the CORESET,
wherein the configuration information related to the CORESET includes a transmission configuration indicator (TCI) state related to the CORESET,
wherein the UE receives monitoring information related to reducing a range of a target to be monitored based on the configuration information, and
wherein, based on the TCI state having an unavailable value, the UE does not monitor on the CORESET related to the TCI state.

* * * * *